US012738235B2

(12) United States Patent
Lee et al.

(10) Patent No.: US 12,738,235 B2
(45) Date of Patent: Sep. 15, 2026

(54) STAGE CIRCUIT AND DISPLAY DEVICE INCLUDING THE SAME, AND ELECTRONIC DEVICE

(71) Applicant: SAMSUNG DISPLAY CO., LTD., Yongin-si (KR)

(72) Inventors: Tak Young Lee, Yongin-si (KR); Bo Gyeong Kim, Yongin-si (KR); Byung Seok Choi, Yongin-si (KR); Bo Yong Chung, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 19/221,949

(22) Filed: May 29, 2025

(65) Prior Publication Data

US 2026/0004740 A1 Jan. 1, 2026

(30) Foreign Application Priority Data

Jun. 26, 2024 (KR) ........................ 10-2024-0083865
Aug. 1, 2024 (KR) ........................ 10-2024-0102471

(51) Int. Cl.
*G09G 3/20* (2006.01)
*G09G 3/3266* (2016.01)
*G09G 3/3233* (2016.01)

(52) U.S. Cl.
CPC ......... *G09G 3/3266* (2013.01); *G09G 3/3233* (2013.01); *G09G 2300/0819* (2013.01);
(Continued)

(58) Field of Classification Search
CPC ............... G09G 3/3266; G09G 3/3233; G09G 2300/0819; G09G 2300/0842;
(Continued)

(56) References Cited

U.S. PATENT DOCUMENTS

| | | | | |
|---|---|---|---|---|
| 11,024,258 B2 * | 6/2021 | Jeong | .................. | G09G 3/3266 |
| 2014/0078029 A1 * | 3/2014 | Jang | .......................... | H03L 7/00 345/82 |
| 2019/0130842 A1 * | 5/2019 | Jang | .................... | G09G 3/3266 |

FOREIGN PATENT DOCUMENTS

| | | |
|---|---|---|
| KR | 10-2017-0080218 A | 7/2017 |
| KR | 10-2018-0073112 A | 7/2018 |

(Continued)

*Primary Examiner* — Chanh D Nguyen
*Assistant Examiner* — Jarurat Suteerawongsa
(74) *Attorney, Agent, or Firm* — F. CHAU & ASSOCIATES, LLC

(57) ABSTRACT

A stage circuit includes five input terminals, three power input terminals, and three output terminals. An input circuit connects to the first and second input terminals and regulates the voltage at a first node. A driver circuit, connected to all three power input terminals, controls the voltages at both the first and a second node. A first output circuit supplies a carry signal to the third output terminal, based on the voltages at the first and second nodes. A second output circuit provides a scan signal to the first output terminal, also based on the voltages at these nodes. A third output circuit, connected to the first and second power input terminals, delivers an emission control signal to the second output terminal, determined by the voltages of a third node (connected to the first node) and a fourth node (connected to the second node).

20 Claims, 10 Drawing Sheets

(52) U.S. Cl.
CPC ............... *G09G 2300/0842* (2013.01); *G09G 2300/0861* (2013.01); *G09G 2310/0286* (2013.01); *G09G 2330/021* (2013.01)

(58) Field of Classification Search
CPC ... G09G 2300/0861; G09G 2310/0286; G09G 2330/021; G09G 3/20
See application file for complete search history.

(56) References Cited

FOREIGN PATENT DOCUMENTS

| | | | |
|---|---|---|---|
| KR | 10-2018-0095773 | A | 8/2018 |
| KR | 10-2018-0095774 | A | 8/2018 |
| KR | 10-2021-0086516 | A | 7/2021 |

* cited by examiner

STAGE CIRCUIT AND DISPLAY DEVICE INCLUDING THE SAME, AND ELECTRONIC DEVICE

CROSS-REFERENCE TO RELATED APPLICATIONS

This application claims priority under 35 U.S.C. § 119 to Korean Patent Application No. 10-2024-0083865 filed on Jun. 26, 2024, and Korean Patent Application No. 10-2024-0102471 filed on Aug. 1, 2024, the disclosures of which are incorporated by reference herein in their entireties.

TECHNICAL FIELD

Embodiments of the present disclosure relate to a stage circuit and a display device including the same, and electronic device.

DISCUSSION OF RELATED ART

As technology advances, the demand for display devices has grown across various applications. For example, display devices are now used in various electronic devices such as smartphones, digital cameras, notebook computers, navigation systems, and smart televisions.

A display device displays an image using pixels, driven by a scan driver. The scan driver may include stage circuits, and supply a scan signal to scan lines, using the stage circuits. The stage circuits may be mounted in a display unit, and accordingly, utilize some of the limited space of the display unit.

SUMMARY

Embodiments of the present disclosure provide a stage circuit and a display device including the same, which can reduce the amount of dead space in the display device.

According to an embodiment of the present disclosure, a stage circuit includes a first input terminal, a second input terminal, a third input terminal, a fourth input terminal, and a fifth input terminal. The stage circuit further includes a first power input terminal, a second power input terminal, and a third power input terminal. The stage circuit further includes a first output terminal, a second output terminal, and a third output terminal. The stage circuit further includes an input circuit connected to the first input terminal and the second input terminal. The input circuit is configured to control a voltage of a first node. The stage circuit further includes a driver connected to the first power input terminal, the second power input terminal, and the third power input terminal. The driver is configured to control the voltage of the first node and a voltage of a second node. The stage circuit further includes a first output circuit connected to the third input terminal and the third power input terminal. The first output circuit is configured to supply a carry signal to the third output terminal, corresponding to the voltage of each of the first node and the second node. The stage circuit further includes a second output circuit connected to the fourth input terminal and the second power input terminal. The second output circuit is configured to supply a scan signal to the first output terminal, corresponding to the voltage of each of the first node and the second node. The stage circuit further includes a third output circuit connected to the second power input terminal and the first power input terminal. The third output circuit is configured to supply an emission control signal to the second output terminal, corresponding to a voltage of each of a third node electrically connected to the first node and a fourth node electrically connected to the second node.

In an embodiment, each of the scan signal and the carry signal has a high level. The scan signal is supplied to the first output terminal, the carry signal is supplied to the third output terminal, and the scan signal and the carry signal at least partially overlap with each other, and. The emission control signal has a low level, is supplied to the second output terminal, and overlaps with the scan signal having the high level.

In an embodiment, the stage circuit further includes a first voltage controller connected to the fifth input terminal. The first voltage controller is configured to control the voltage of the fourth node. The stage circuit further includes a second voltage controller connected to the third input terminal. The second voltage controller is configured to control a voltage of the third output terminal. The stage circuit further includes a voltage maintenance circuit connected to the first power input terminal. The voltage maintenance circuit is configured to maintain the voltage of the third node to be lower than the voltage of the first node when the voltage of the first node increases, and maintain the voltage of the second node to be lower than the voltage of the fourth node when the voltage of the fourth node increases.

In an embodiment, a start signal or a previous carry signal of a previous stage is input to the first input terminal, a first carry clock signal is input to the second input terminal, a second carry clock signal is input to the third input terminal, a first clock signal is input to the fourth input terminal, and a second clock signal is input to the fifth input terminal. A first power source is input to the first power input terminal, a second power source lower than the first power source is input to the second power input terminal, and a third power source lower than the first power source is input to the third power input terminal.

In an embodiment, the first carry clock signal and the second carry clock signal have a same cycle and have a phase difference of about 120 degrees.

In an embodiment, the first clock signal and the second clock signal have a same cycle and have a phase difference of about 120 degrees.

In an embodiment, a voltage of the third power source is lower than a voltage of the second power source.

In an embodiment, the third power source and the second power source have a same voltage.

In an embodiment, the second carry clock signal and the first clock signal are a same signal.

In an embodiment, the input circuit includes a first input transistor and a second input transistor, connected in series between the first input terminal and the first node. Each of the first input transistor and the second input transistor includes a gate electrode connected to the second input terminal.

In an embodiment, the driver includes a first driving transistor connected between the first power input terminal and a fifth node. The first driving transistor includes a gate electrode connected to the first node. The driver further includes a second driving transistor connected between the second power input terminal and the second node. The second driving transistor includes a gate electrode connected to the first node. The driver further includes a third driving transistor and a fourth driving transistor, connected in series between the fifth node and the first power input terminal. Each of the third driving transistor and the fourth driving transistor includes a gate electrode connected to the first power input terminal, The driver further includes a fifth driving transistor connected between the second node and the first power input terminal. The fifth driving transistor includes a gate electrode connected to the fifth node. The driver further includes a capacitor connected between the fifth node and the second node.

In an embodiment, the first output circuit includes a first carry transistor connected between the third input terminal and the third output terminal. The first carry transistor includes a gate electrode connected to the first node. The first output circuit further includes a second carry transistor connected between the third output terminal and the third power input terminal. The second carry transistor includes a gate electrode connected to the second node. The first output circuit further includes a carry capacitor connected between the first node and the third output terminal.

In an embodiment, the second output circuit includes a first scan transistor connected between the fourth input terminal and the first output terminal. The first scan transistor includes a gate electrode connected to the first node. The second output circuit further includes a second scan transistor connected between the first output terminal and the second power input terminal. The second scan transistor includes a gate electrode connected to the second node.

In an embodiment, the third output circuit includes a first emission transistor connected between the second power input terminal and the second output terminal. The first emission transistor includes a gate electrode connected to the third node. The third output circuit further includes a second emission transistor connected between the second output terminal and the first power input terminal. The second emission transistor includes a gate electrode connected to the fourth node. The third output circuit further includes an emission capacitor connected between the fourth node and the second output terminal.

In an embodiment, the first voltage controller includes a first capacitor including a second electrode connected to the fourth node, and a first transistor connected between a first electrode of the first capacitor and the fifth input terminal. The first transistor includes a gate electrode connected to the fourth node.

In an embodiment, the second voltage controller includes a first control transistor and a second control transistor, connected in series between the first node and the third output terminal. A gate electrode of the first control transistor is connected to the third input terminal, and a gate electrode of the second control transistor is connected to the second node.

In an embodiment, the voltage maintenance circuit includes a first maintenance transistor connected between the first node and the third node. The first maintenance transistor includes a gate electrode connected to the first power input terminal. The voltage maintenance circuit further includes a second maintenance transistor connected between the second node and the fourth node. The second maintenance transistor includes a gate electrode connected to the first power input terminal.

According to an embodiment of the present disclosure, a display device includes a display panel including a plurality of pixels connected to a plurality of scan lines, a plurality of data lines, and a plurality of emission control lines, and a scan driver including a plurality of stage circuits configured to supply a scan signal and an emission control signal, respectively, to the scan lines and the emission control lines. Each of the stage circuits includes a first input terminal, a second input terminal, a third input terminal, a fourth input terminal, and a fifth input terminal. Each of the stage circuits further includes a first power input terminal, a second power input terminal, and a third power input terminal. Each of the stage circuits further includes a first output terminal, a second output terminal, and a third output terminal. Each of the stage circuits further includes an input circuit connected to the first input terminal and the second input terminal. The input circuit is configured to control a voltage of a first node. Each of the stage circuits further includes a driver connected to the first power input terminal, the second power input terminal, and the third power input terminal. The driver is configured to control the voltage of the first node and a voltage of a second node. Each of the stage circuits further includes a first output circuit connected to the third input terminal and the third power input terminal. The first output circuit is configured to supply a carry signal to the third output terminal, corresponding to the voltage of each of the first node and the second node. Each of the stage circuits further includes a second output circuit connected to the fourth input terminal and the second power input terminal. The second output circuit is configured to supply a scan signal to the first output terminal, corresponding to the voltage of each of the first node and the second node. Each of the stage circuits further includes a third output circuit connected to the second power input terminal and the first power input terminal. The third output circuit is configured to supply an emission control signal to the second output terminal, corresponding to a voltage of each of a third node electrically connected to the first node and a fourth node electrically connected to the second node. Each of the stage circuits further includes a first voltage controller connected to the fifth input terminal. The first voltage controller is configured to control the voltage of the fourth node. Each of the stage circuits further includes a second voltage controller connected to the third input terminal. The second voltage controller is configured to control a voltage of the third output terminal. Each of the stage circuits further includes a voltage maintenance circuit connected to the first power input terminal. The voltage maintenance circuit is configured to maintain the voltage of the third node to be lower than the voltage of the first node when the voltage of the first node increases, and maintain the voltage of the second node to be lower than the voltage of the fourth node when the voltage of the fourth node increases.

In an embodiment, a start signal or a carry signal is input to a first input terminal of a pth stage circuit, where $p=3k-2$ and k is a positive integer. A first carry clock signal is input to a second input terminal of the pth stage circuit, a third carry clock signal is input to a third input terminal of the pth stage circuit, a third clock signal is input to a fourth input terminal of the pth stage circuit, and a fifth clock signal is input to a fifth input terminal of the pth stage circuit. A carry signal of a previous stage circuit is input to a first input terminal of a (p+1)th stage circuit, the third carry clock signal is input to a second input terminal of the (p+1)th stage circuit, a fifth carry clock signal is input to a third input terminal of the (p+1)th stage circuit, the fifth clock signal is input to a fourth input terminal of the (p+1)th stage circuit, and a first clock signal is input to a fifth input terminal of the (p+1)th stage circuit. A carry signal of a previous stage circuit is input to a first input terminal of a (p+2)th stage circuit, the third carry clock signal is input to a second input terminal of the (p+2)th stage circuit, the first carry clock signal is input to a third input terminal of the (p+2)th stage circuit, the first clock signal is input to a fourth input terminal of the (p+2)th stage circuit, and the third clock signal is input to a fifth input terminal of the (p+2)th stage circuit.

In an embodiment, the first clock signal, a second clock signal, and the third clock signal are sequentially supplied while having a phase difference of about 120 degrees. The first carry clock signal has a same cycle and phase as the first clock signal, a second carry clock signal has a same cycle and phase as the second clock signal, and the third carry clock signal has a same cycle and phase as the third clock signal.

According to an embodiment of the present disclosure, an electronic device includes a processor to provide input image data; and a display device to display an image based on the input image data. The display device includes a display panel including a plurality of pixels connected to a plurality of scan lines, a plurality of data lines, and a plurality of emission control lines, and a scan driver including a plurality of stage circuits configured to supply a scan signal and an emission control signal, respectively, to the scan lines and the emission control lines. Each of the stage circuits includes a first input terminal, a second input terminal, a third input terminal, a fourth input terminal, and a fifth input terminal. Each of the stage circuits further includes a first power input terminal, a second power input terminal, and a third power input terminal. Each of the stage circuits further includes a first output terminal, a second output terminal, and a third output terminal. Each of the stage circuits further includes an input circuit connected to the first input terminal and the second input terminal. The input circuit is configured to control a voltage of a first node. Each of the stage circuits further includes a driver connected to the first power input terminal, the second power input terminal, and the third power input terminal. The driver is configured to control the voltage of the first node and a voltage of a second node. Each of the stage circuits further includes a first output circuit connected to the third input terminal and the third power input terminal. The first output circuit is configured to supply a carry signal to the third output terminal, corresponding to the voltage of each of the first node and the second node. Each of the stage circuits further includes a second output circuit connected to the fourth input terminal and the second power input terminal. The second output circuit is configured to supply a scan signal to the first output terminal, corresponding to the voltage of each of the first node and the second node. Each of the stage circuits further includes a third output circuit connected to the second power input terminal and the first power input terminal. The third output circuit is configured to supply an emission control signal to the second output terminal, corresponding to a voltage of each of a third node electrically connected to the first node and a fourth node electrically connected to the second node.

BRIEF DESCRIPTION OF THE DRAWINGS

The above and other features of the present disclosure will become more apparent by describing in detail embodiments thereof with reference to the accompanying drawings.

DETAILED DESCRIPTION

Figure 1:
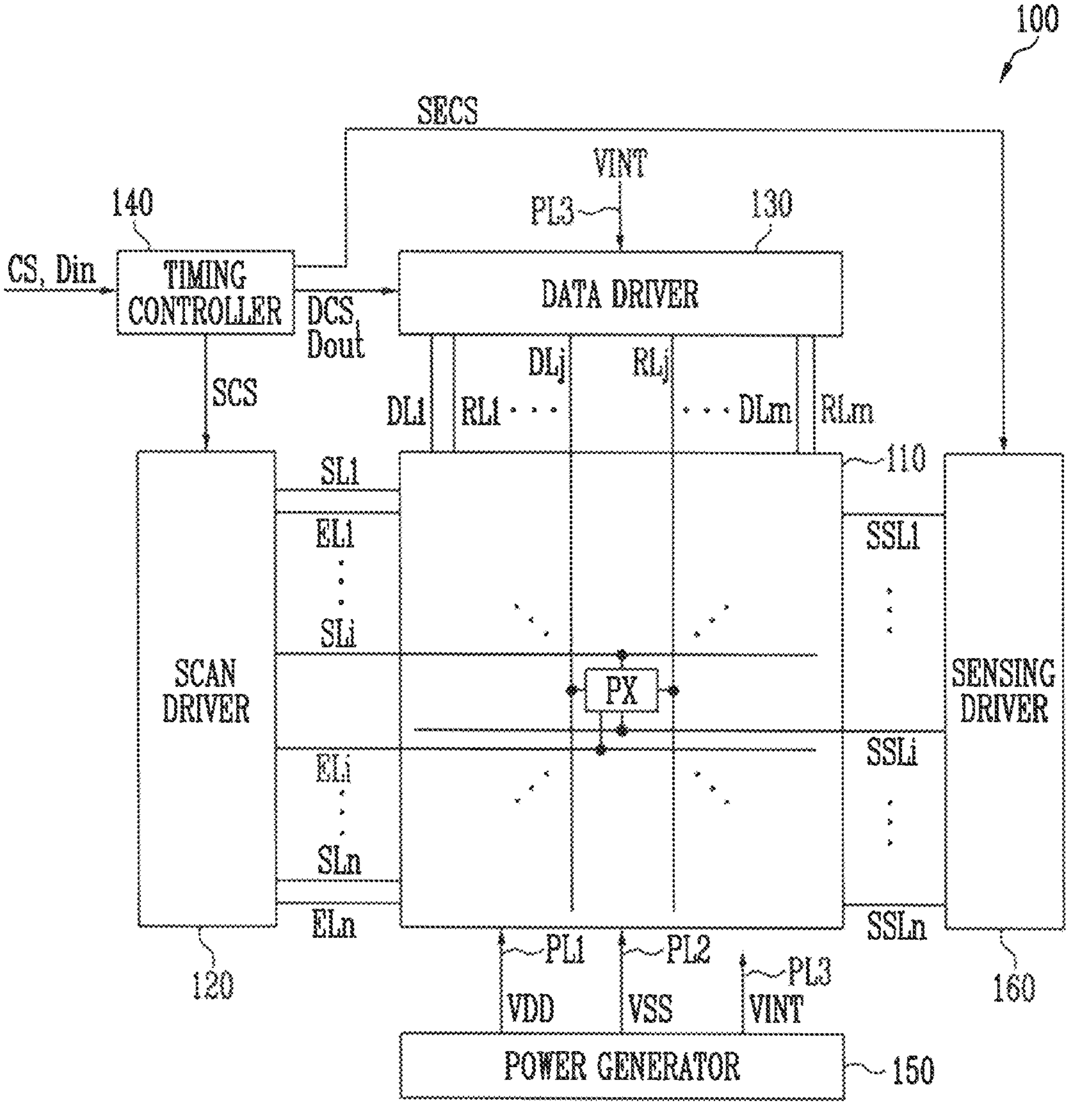
FIG. 1 is a diagram illustrating a display device according to embodiments of the present disclosure.

Embodiments of the present disclosure will be described more fully hereinafter with reference to the accompanying drawings. Like reference numerals may refer to like elements throughout the accompanying drawings.

Some embodiments are described with reference to the accompanying drawings in relation to functional blocks, units, and/or modules. Those skilled in the art will understand that these blocks, units, and/or modules may be physically implemented by, for example, logic circuits, individual components, microprocessors, hard wire circuits, memory elements, line connection, and other electronic circuits. This may be formed by using semiconductor-based manufacturing techniques or other manufacturing techniques. In the case of blocks, units, and/or modules implemented by microprocessors or other similar hardware, the units, and/or modules are programmed and controlled by using software, to perform various functions discussed in the present disclosure, and may be selectively driven by firmware and/or software. In addition, each block, each unit, and/or each module may be implemented by dedicated hardware or by a combination dedicated hardware to perform some functions of the block, the unit, and/or the module and a processor (e.g., one or more programmed microprocessors and associated circuitry) to perform other functions of the block, the unit, and/or the module. In some embodiments, the blocks, the units, and/or the modules may be physically separated into two or more individual blocks, two or more individual units, and/or two or more individual modules without departing from the scope of the present disclosure. Also, in some embodiments, the blocks, the units, and/or the modules may be physically separated into more complex blocks, more complex units, and/or more complex modules without departing from the scope of the present disclosure.

The term "connection" between two components may include both an electrical connection and/or a physical connection, but the present disclosure is not necessarily limited thereto. For example, the term "connection" used based on circuit diagrams may mean electrical connection, and the term "connection" used based on cross-sectional and plan views may mean physical connection.

It will be understood that, although the terms "first," "second," etc. may be used herein to describe various elements, these elements should not be limited by these terms. These terms are only used to distinguish one element from another element. Thus, a "first" element discussed below could also be termed a "second" element without departing from the teachings of the present disclosure.

It should be understood that descriptions of features or aspects within each embodiment should typically be considered as available for other similar features or aspects in other embodiments, unless the context clearly indicates otherwise.

As used herein, the singular forms "a", "an" and "the" are intended to include the plural forms as well, unless the context clearly indicates otherwise.

Spatially relative terms, such as "beneath", "below", "lower", "under", "above", "upper", etc., may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below.

It will be understood that when a component is referred to as being "on", "connected to", "coupled to", or "adjacent to" another component, it can be directly on, connected, coupled, or adjacent to the other component, or intervening components may be present. It will also be understood that when a component is referred to as being "between" two components, it can be the only component between the two components, or one or more intervening components may also be present. It will also be understood that when a component is referred to as "covering" another component, it can be the only component covering the other component, or one or more intervening components may also be covering the other component. Other words used to describe the relationships between components should be interpreted in a like fashion.

Herein, when two or more elements or values are described as being substantially the same as or about equal to each other, it is to be understood that the elements or values are identical to each other, the elements or values are equal to each other within a measurement error, or if measurably unequal, are close enough in value to be functionally equal to each other as would be understood by a person having ordinary skill in the art. For example, the term "about" as used herein is inclusive of the stated value and means within an acceptable range of deviation for the particular value as determined by one of ordinary skill in the art, considering the measurement in question and the error associated with measurement of the particular quantity (e.g., the limitations of the measurement system). For example, "about" may mean within one or more standard deviations as understood by one of the ordinary skill in the art. Further, it is to be understood that while parameters may be described herein as having "about" a certain value, according to embodiments, the parameter may be exactly the certain value or approximately the certain value within a measurement error as would be understood by a person having ordinary skill in the art.

For example, The term "about" as used herein is inclusive of the stated value and means within an acceptable range of deviation for the particular value as determined by one of ordinary skill in the art, considering the measurement in question and the error associated with measurement of the particular quantity (e.g., the limitations of the measurement system). For example, "about" can mean within one or more standard deviations, or within ±30%, 20%, 10% or 5% of the stated value. Other uses of these terms and similar terms to describe the relationships between components should be interpreted in a like fashion.

Embodiments of the present application provide an electronic device having a display unit, such as, for example, a smartphone, capable of efficiently supplying both a scan signal and an emission control signal from a single stage circuit. This design may reduce dead space in the display unit by integrating the signals used for operating the device through one stage circuit instead of separate components, which may provide a more compact and efficient layout.

FIG. 1 is a diagram illustrating a display device according to embodiments of the present disclosure.

Referring to FIG. 1, the display device 100 according to an embodiment of the present disclosure may include a display unit 110 (or display panel), a scan driver 120, a data driver 130, a timing controller 140, a power generator 150, and a sensing driver 160. The scan driver 120, the data driver 130, the timing controller 140, the power generator 150, and the sensing driver 160 may constitute a driving device which drives the display unit 110.

The display unit 110 may display an image. The display unit 110 may include pixels PX connected to scan lines SL1, . . . , SLi, . . . , and SLn, sensing lines SSL1, . . . , SSLi, . . . , and SSLn, emission control lines EL1, . . . , ELi, . . . , and ELn, data lines DL1, . . . , DLj, . . . , and DLm, and readout lines RL1, . . . , RLj, . . . , and RLm, where n and m are natural numbers of 3 or more, i is a natural number of n or less and 1 or more, and j is a natural number of m or less and 1 or more).

A pixel PX may be connected to one of the scan lines SL1 to SLn and one of the data lines DL1 to DLm. Also, the pixel PX may be connected to one of the sensing lines SSL1 to SSLn, one of the emission control lines EL1 to ELn, and one of the readout lines RL1 to RLm.

In an example, a pixel PX located on an ith row and a jth column may be connected to an ith scan line SLi, an ith sensing line SSLi, an ith emission control line ELi, a jth data line DLj, and a jth readout line RLj. Also, the pixel PX may be connected to a first power line PL1 to which a first driving power source VDD is applied and a second power line PL2 to which a second driving power source VSS is applied.

The first driving power source VDD may be a power source which supplies a driving current to the pixel PX, and the second driving power source VSS may be a power source which is supplied with a driving current from the pixel PX. The first driving power source VDD may be set to a voltage higher than a voltage of the second driving power source VSS during an emission period of the pixel PX.

The pixel PX may be initialized by an initialization power source VINT provided through the readout line RLj in response to a sensing signal provided through the sensing line SSLi, and be supplied with a data signal (or data voltage) through the data line DLj in response to a scan signal provided through the scan line SLi. The pixel PX may be set to be in a non-emission state by an emission control signal provided through the emission control line ELi during a period in which the pixel PX is supplied with the data signal.

The pixel PX may generate light with a luminance corresponding to a data signal while controlling an amount of current flowing from the first driving power source VDD to the second driving power source VSS via a light emitting element LD (see FIG. 2), corresponding to the data signal. The initialization power source VINT may be set to a voltage lower than an operation point (or threshold voltage) of the light emitting element LD.

The scan driver 120 may generate a scan signal and an emission control signal, based on a scan control signal SCS. The scan signal may be sequentially supplied to the scan lines SL1 to SLn, and the emission control signal may be sequentially supplied to the emission control signals EL1 to ELn.

The scan control signal SCS may include, for example, a start signal, a clock signal, and the like, and be provided from the timing controller 140 to the scan driver 120. The scan driver 120 may be implemented as a shift register which sequentially generates and outputs the scan signal and the emission control signal in a pulse form by sequentially shifting the start signal, corresponding to the clock signal. An enable scan signal and a disable emission control signal may have voltages of different polarities. The enable scan signal supplied to a specific horizontal line may overlap with the disable emission control signal supplied to the specific horizontal line.

Figure 2:
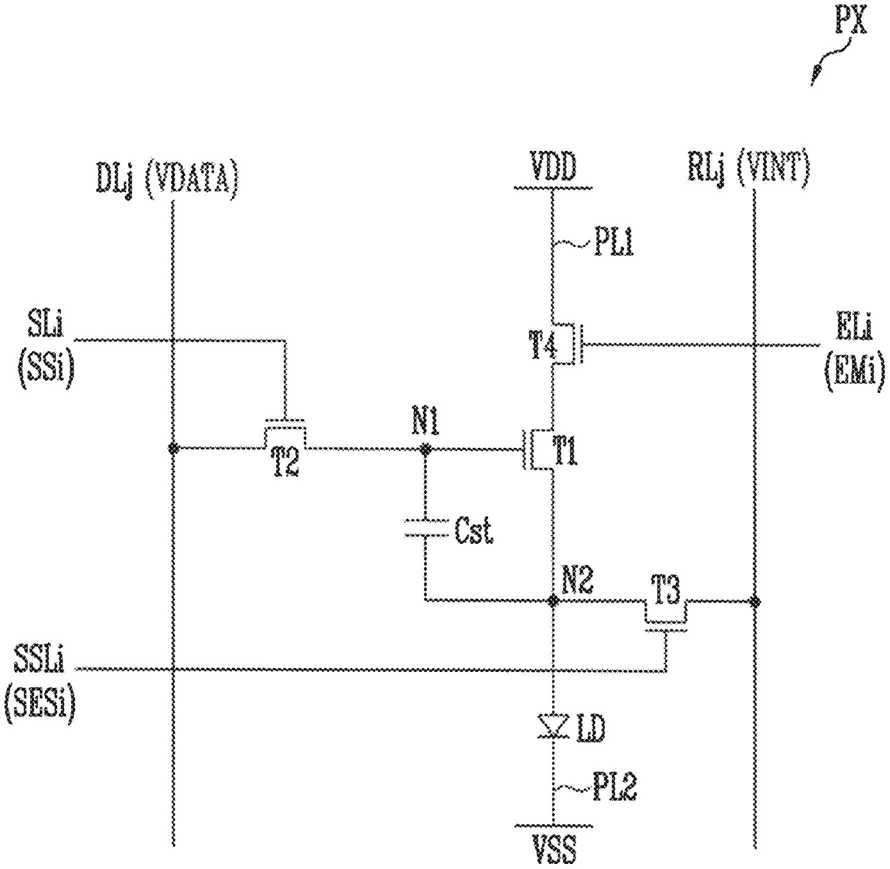
FIG. 2 is a diagram illustrating an embodiment of a pixel shown in FIG. 1.

In an embodiment, the enable scan signal may have a gate-on voltage such that a transistor supplied with the scan signal can be turned on. In an example, when the transistor supplied with the scan signal is set as an N-type transistor as shown in FIG. 2, the enable scan signal may have a logic high voltage.

In an embodiment, the disable emission control signal may have a gate-off voltage such that a transistor supplied with the emission control signal can be turned off. In an example, when the transistor supplied with the emission control signal is set as an N-type transistor as shown in FIG. 2, the disable emission control signal may have a logic low voltage.

The scan driver 120 may be formed together with pixels PX in the display unit 110. In an example, the scan driver 120 may include stage circuits, and the stage circuits may be formed in the display unit 110 during the manufacturing process. The scan driver 120 may supply both the scan signal and the emission control signal together, and accordingly, a dead space of the display unit 110 can be reduced. Referring to a comparative example, when the scan signal and the emission control signal are supplied by separate drivers, the separate drivers may be mounted in a designated area in the display unit 110, referred to here as a first area in the display unit 110. In contrast, the scan driver 120 according to embodiments of the present disclosure, which supplies both the scan signal and the emission control signal together, may be mounted in a second, smaller (or narrower) area than the first area in the display unit 110. Accordingly, embodiments of the present application may reduce dead space and efficiently utilize available space in the display unit 110.

The sensing driver 160 may generate a sensing signal, based on a sensing control signal SECS. The sensing signal may be sequentially supplied to the sensing lines SSL1 to SSLn.

The sensing control signal SECS may include, for example, a start signal, a clock signal, and the like, and be provided from the timing controller 140 to the sensing driver 160. The sensing driver 160 may be implemented as a shift register which sequentially generates and outputs the sensing signal in a pulse form by sequentially shifting the start signal, corresponding to the clock signal. An enable sensing signal may have a gate-on voltage such that a transistor supplied with the sensing signal can be turned on. When the transistor supplied with the sensing signal is set as an N-type transistor as shown in FIG. 2, the enable sensing signal may have a logic high voltage. The enable sensing signal supplied to a specific horizontal line may overlap with the enable scan signal supplied to the specific horizontal line.

The data driver 130 may generate a data signal (or data voltage), based on output data Dout and a data control signal DCS, which are provided from the timing controller 140, and provide the data signal to the display unit 110 (or the pixel PX) through the data lines DL1 to DLm. The data control signal DCS may include, for example, a data enable signal, a data clock signal, and the like. The data driver 130 may provide the initialization power source VINT to the display unit 110 (or the pixel PX) through the readout lines RL1 to RLm.

In an embodiment, the data driver 130 may receive a sensing signal through the readout line RL1 to RLm in a separate sensing period (e.g., a sensing period allocated to sense characteristic information of the pixel PX, such as a threshold voltage and/or a mobility of a driving transistor included in the pixel PX). The sensing signal may be used to compensate for a characteristic (or characteristic variation) of the pixel PX in the data driver 130 and/or the timing controller 140.

In an embodiment, the readout lines RL1 to RLm may be connected to a separate sensing unit. The sensing unit may supply a voltage of the initialization power source VINT to the display unit 110, or receive a sensing signal through the readout lines RL1 to RLm.

The power generator 150 may supply the first driving power source VDD and the second driving power source VSS to the display unit 110. The power generator 150 may supply the initialization power source VINT to the data driver 130. The power generator 150 may provide a driving voltage utilized to drive at least one of the scan driver 120, the data driver 130, the timing controller 140, and the sensing driver 160. The power generator 150 may be implemented as a power management IC (PMIC).

The first driving power source VDD may be supplied to the display unit 110 through the first power line PL1. The second driving power source VSS may be supplied to the display unit 110 through the second power line PL2. The initialization power source VINT may be supplied to the data driver 130 through a third power line PL3. The first power line PL1 and the second power line PL2 may be commonly connected to the pixels PX.

The timing controller 140 may receive input data Din and a control signal CS from an external source (e.g., a graphic processor, an application processor, or the like), and generate the scan control signal SCS, the sensing control signal SECS, and the data signal DCS, based on the control signal CS.

The timing controller 140 may realign the input data Din to be suitable for specifications of the display device 100. Also, the timing controller 140 may generate output data Dout by correcting the input data Din, and supply the output data Dout to the data driver 130. In an embodiment, the timing controller 140 may correct the input data Din, corresponding to a measurement result measured in a processing procedure.

FIG. 2 is a diagram illustrating an embodiment of the pixel shown in FIG. 1. In FIG. 2, a pixel PX located on an ith row and a jth column is exemplarily illustrated. The pixel PX shown in FIG. 2 is merely an embodiment, and the structure of the pixel PX of the present disclosure is not limited thereto. In an example, in an embodiment of the present disclosure, the pixel PX may be selected as any one of various circuits currently known in the art.

Referring to FIG. 2, the pixel PX may be connected to a scan line SLi, a sensing line SSLi, an emission control line ELi, a data line DLj, and a readout line RLj.

The pixel PX may include a light emitting element LD, a first transistor T1 (or driving transistor), a second transistor T2, a third transistor T3, a fourth transistor T4, and a storage capacitor Cst. Each of the first transistor T1, the second transistor T2, the third transistor T3, and the fourth transistor T4 may be a thin film transistor including an oxide semiconductor. Each of the first transistor T1, the second transistor T2, the third transistor T3, and the fourth transistor T4 may be an N-type transistor.

A first electrode (or anode electrode) of the light emitting element LD may be connected to the first power line PL1 via a second node N2, the first transistor T1, and the fourth transistor T4, and a second electrode (or cathode electrode) of the light emitting element LD may be connected to the second power line PL2. The light emitting element LD may emit light with a luminance corresponding to a driving current supplied from the first transistor T1.

In an embodiment, the light emitting element LD may be an organic light emitting diode. In an embodiment, the light emitting element LD may be an inorganic light emitting diode such as, for example, a micro LED (light emitting diode) or a quantum dot light emitting diode. In an embodiment, the light emitting element LD may be an element made of a combination of an organic material and an inorganic material. In FIG. 2, it is illustrated that the pixel PX is a single light emitting element LD. However, the present disclosure is not limited thereto. For example, in an embodiment, the pixel PX may include a plurality of light emitting elements, and the plurality of light emitting elements may be connected in series, parallel, or series/parallel to each other.

A first electrode (e.g., a drain electrode) of the first transistor T1 may be connected to the first power line PL1 to which the first driving power source VDD is applied via the fourth transistor T4, and a second electrode (e.g., a source electrode) of the first transistor T1 may be connected to the second node N2. A gate electrode of the first transistor T1 may be connected to a first node N1. The first transistor T1 may control an amount of current flowing through the light emitting element LD, corresponding to a voltage of the first node N1 (or a gate-source voltage applied between the gate electrode and the second electrode of the first transistor T1).

A first electrode of the second transistor T2 may be connected to the data line DLj, and a second electrode of the second transistor T2 may be connected to the first node N1. A gate electrode of the second transistor T2 may be connected to the scan line SLi. When an enable scan signal SSi is supplied to the scan line SLi, the second transistor T2 may be turned on, and a data signal VDATA may be transferred from the data line DLj to the first node N1. When a disable scan signal SSi is supplied to the scan line SLi, the second transistor T2 may be turned off.

The storage capacitor Cst may be formed or connected between the first node N1 and the second node N2. The storage capacitor Cst may store the voltage of the first node N1.

The third transistor T3 may be connected between the readout line RLj and the second node N2. A gate electrode of the third transistor T3 may be connected to the sensing line SSLi. When an enable sensing signal SESi is supplied to the sensing line SSLi, the third transistor T3 may be turned on, and the voltage of the initialization power source VINT may be transferred from the readout line RLj to the second node N2. When a disable sensing signal SESi is supplied to the sensing line SSLi, the third transistor T3 may be turned off.

The fourth transistor T4 may be connected between the first power line PL1 and the first electrode of the first transistor T1. A gate electrode of the fourth transistor T4 may be connected to the emission control line ELi. When a disable emission control signal EMi is supplied to the emission control line ELi, the fourth transistor T4 may be turned off, and an electrical connection between the first power line PL1 and the first transistor T1 may be blocked. When an enable emission control signal EMi is supplied to the emission control line ELi, the fourth transistor T4 may be turned on.

An operation process will be briefly described. First, as the disable emission control signal EMi is supplied to the emission control line ELi, the fourth transistor T4 may be turned off. When the fourth transistor T4 is turned off, the first power line PL1 and the first transistor T1 may be electrically blocked from each other, and accordingly, the light emitting element LD may be set to be in a non-emission state. For example, when the disable emission control signal EMi is sent to the emission control line ELi, the fourth transistor T4 may turn off. With the fourth transistor T4 turned off, the first power line PL1 may be electrically isolated from the first transistor T1, which in turn may place the light-emitting element LD into a non-emission state.

After the fourth transistor T4 is turned off, the enable scan signal SSi may be supplied to the scan line SLi, and the enable sensing signal SESi may be supplied to the sensing line SSLi. When the enable scan signal SSI is supplied to the scan line SLi, the second transistor T2 may be turned on, and accordingly, the data signal VDATA from the data line DLj may be supplied to the first node N1. When the enable sensing signal SESi is supplied to the sensing line SSLi, the third transistor T3 may be turned on, and accordingly, the voltage of the initialization power source VINT from the readout line RLj may be supplied to the second node N2. For example, when the enable scan signal SSi is applied to the scan line SLi, the second transistor T2 may turn on, allowing the data signal VDATA from the data line DLj to reach the first node N1. Similarly, when the enable sensing signal SESi is applied to the sensing line SSLi, the third transistor T3 may turn on, thereby enabling the voltage from the initialization power source VINT on the readout line RLj to reach the second node N2.

When the second transistor T2 and the third transistor T3 are simultaneously turned on in response to the enable scan signal SSi and the enable sensing signal SESi, a voltage difference between the data signal VDATA and the initialization power source VINT may be stored in the storage capacitor Cst.

As the enable emission control signal EMi may be supplied to the emission control line ELi after a voltage corresponding to the data signal VDATA is stored in the storage capacitor Cst, the fourth transistor T4 may be turned on. In an embodiment, when the fourth transistor T4 is turned on, the first power line PL1 and the first transistor T1 are electrically connected to each other. The amount of current flowing through the light emitting element LD may be controlled corresponding to the voltage difference stored in the storage capacitor Cst.

In an embodiment, when the second node N2 and the readout line RLj are connected to each other as the third transistor T3 is turned on in a sensing period, a sensing signal may be provided to the readout line RLj from the pixel PX.

Figure 3:
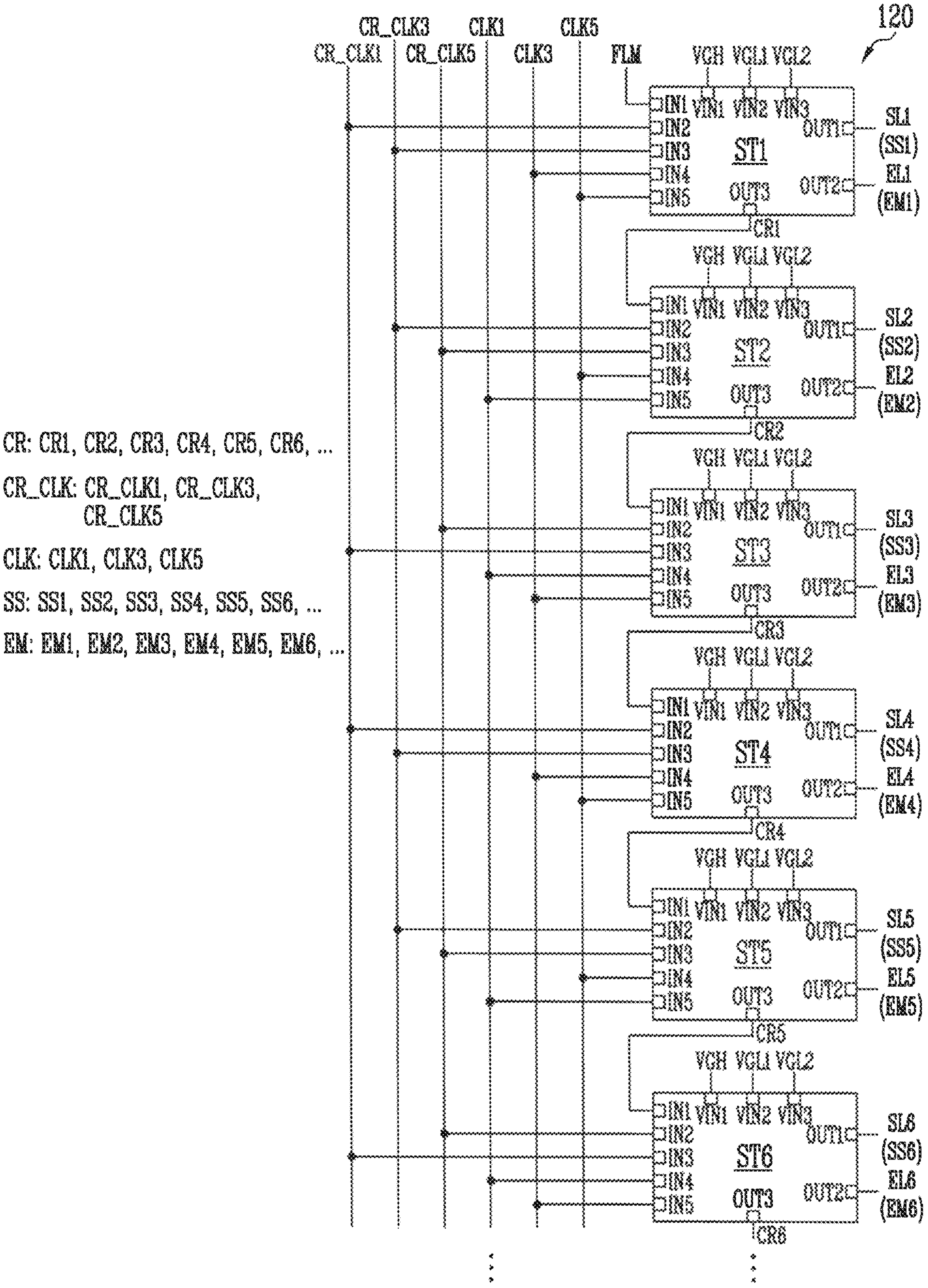
FIG. 3 is a diagram illustrating a stage circuit of a scan driver according to embodiments of the present disclosure.
Figure 4:
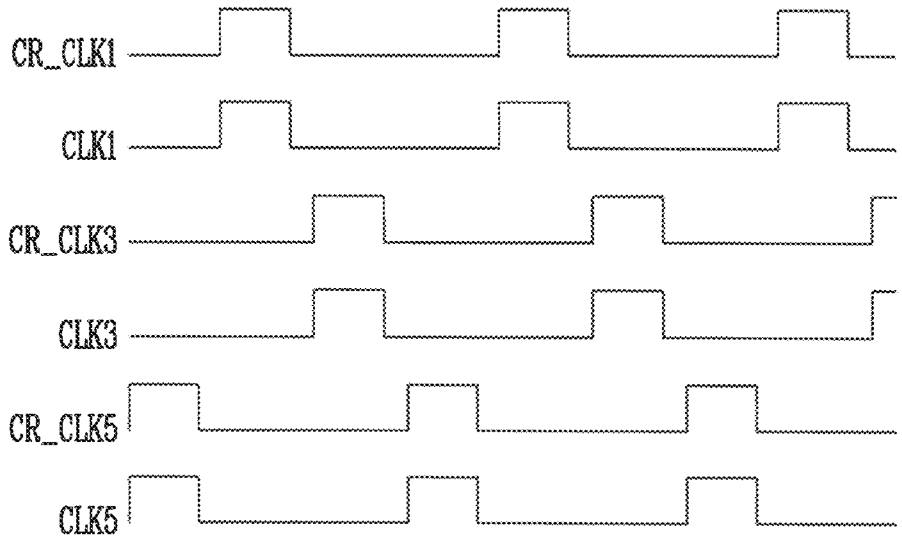
FIG. 4 is a diagram illustrating an embodiment of carry clock signals and clock signals, which are shown in FIG. 3.

FIG. 3 is a diagram illustrating a stage circuit of the scan driver according to embodiments of the present disclosure. FIG. 4 is a diagram illustrating an embodiment of carry clock signals and clock signals, which are shown in FIG. 3.

Referring to FIG. 3, the scan driver 120 may include a plurality of stage circuits ST1, ST2, ST3, ST4, ST5, ST6, . . . . Each of the stage circuits ST1 to ST6 may be connected to any one of the scan lines SL1 to SLn and any one of the emission control lines EL1 to ELn.

In an example, a first stage circuit ST1 may be electrically connected to a scan line SL1 and an emission control line EL1, and supply a scan signal SS1 and an emission control signal EM1 respectively to the scan line SL1 and the emission control line EL1. A second stage circuit ST2 may be electrically connected to a scan line SL2 and an emission control line EL2, and supply a scan signal SS2 and an emission control signal EM2 respectively to the scan line SL2 and the emission control line EL2.

A third stage circuit ST3 may be electrically connected to a scan line SL3 and an emission control line EL3, and supply a scan signal SS3 and an emission control signal EM3 respectively to the scan line SL3 and the emission control line EL3. A fourth stage circuit ST4 may be electrically connected to a scan line SL4 and an emission control line EL4, and supply a scan signal SS4 and an emission control signal EM4 respectively to the scan line SL4 and the emission control line EL4.

A fifth stage circuit ST5 may be electrically connected to a scan line SL5 and an emission control line EL5, and supply a scan signal SS5 and an emission control signal EM5 respectively to the scan line SL5 and the emission control line EL5. A sixth stage circuit ST6 may be electrically connected to a scan line SL6 and an emission control line EL6, and supply a scan signal SS6 and an emission control signal EM6 respectively to the scan line SL6 and the emission control line EL6.

For example, according to embodiments of the present disclosure, the scan driver 120 may include multiple stage circuits (e.g., ST1, ST2, ST3, etc.), each connected to a specific scan line SL1 to SLn and emission control line EL1 to ELn. Each stage circuit may supply a dedicated scan signal (e.g., SS1, SS2) and an emission control signal (e.g., EM1, EM2) to its respective scan and emission control lines. For example, the first stage circuit ST1 may connect to the scan line SL1 and the emission control line EL1 and provide signals SS1 and EM1, the second stage circuit ST2 may connect similarly to SL2 and EL2 and provide SS2 and EM2, etc., resulting in coordinated operation across all circuits in the scan driver. 120.

Each of the stage circuits ST1 to ST6 may include a first input terminal IN1, a second input terminal IN2, a third input terminal IN3, a fourth input terminal IN4, a fifth input terminal IN5, a first power input terminal VIN1, a second power input terminal VIN2, a third power input terminal VIN3, a first output terminal OUT1, a second output terminal OUT2, and a third output terminal OUT3.

A start signal FLM or a carry signal CR (or CR1, CR2, CR3, CR4, CR5, CR6, . . . ) of a previous stage circuit may be input to the first input terminal IN1. In an example, the start signal FLM may be input to a first input terminal IN1 of the first stage circuit ST1. A carry signal CR of a previous stage circuit may be input to a first input terminal IN1 of each of the second to sixth stage circuits ST2 to ST6. In an example, a carry signal CR1 of the first stage circuit ST1 may be input to a first input terminal IN1 of the second stage circuit ST2.

A first carry clock signal CR_CLK1, a third carry clock signal CR_CLK3, or a fifth carry clock signal CR_CLK5 may be input to the second input terminal IN2. In an example, the first carry clock signal CR_CLK1 may be input to a second input terminal IN2 of a kth (where k is 1, 4, . . . ) stage circuit ST1, ST4, . . . . In an example, the third carry clock signal CR_CLK3 may be input to a second input terminal IN2 of a (k+1)th stage circuit ST2, ST5, . . . . In an example, the fifth carry clock signal CR_CLK5 may be input to a second input terminal IN2 of the (k+2)th stage circuit ST3, ST6, . . . .

The first carry clock signal CR_CLK1, the third carry clock signal CR_CLK3, and the fifth carry clock signal CR_CLK5 may be signals which have the same cycle and have different phases as shown in FIG. 4. The first carry clock signal CR_CLK1, the third carry clock signal CR_CLK3, and the fifth carry clock signal CR_CLK5 may have a phase difference of about 120 degrees from each other. In an example, the third carry clock signal CR_CLK3 may have a phase which is different by about 120 degrees from a phase of the first carry clock signal CR_CLK1. In an example, the fifth carry clock signal CR_CLK5 may have a phase which is different by about 120 degrees from the phase of the third carry clock signal CR_CLK3 and different by about 240 degrees from the phase of the first carry clock signal CR_CLK1.

For example, according to embodiments, the first carry clock signal CR_CLK1, the third carry clock signal CR_CLK3, and the fifth carry clock signal CR_CLK5 may operate with the same cycle but at different phases, as shown in FIG. 4. These signals may be offset by about 120 degrees relative to each other. For example, the third carry clock signal CR_CLK3 may be shifted by about 120 degrees from the phase of the first carry clock signal CR_CLK1. Similarly, the fifth carry clock signal CR_CLK5 may be shifted by about 120 degrees from CR_CLK3 and by about 240 degrees from CR_CLK1.

The first carry clock signal CR_CLK1, the third carry clock signal CR_CLK3, or the fifth carry clock signal CR_CLK5 may be input to the third input terminal IN3. In an example, the third carry clock signal CR_CLK3 may be input to a third input terminal IN3 of the kth stage circuit ST1, ST4, . . . . In an example, the fifth carry clock signal CR_CLK5 may be input to a third input terminal IN3 of the (k+1)th stage circuit ST2, ST5, . . . . In an example, the first carry clock signal CR_CLK1 may be input to a third input terminal IN3 of the (k+2)th stage circuit ST3, ST6, . . . .

A first clock signal CLK1, a third clock signal CLK3, or a fifth clock signal CLK5 may be input to the fourth input terminal IN4. In an example, the third clock signal CLK3 may be input to a fourth input terminal IN4 of the kth stage circuit ST1, ST4, . . . . In an example, the fifth clock signal CLK5 may be input to a fourth input terminal IN4 of the (k+1)th stage circuit ST2, ST5, . . . . In an example, the first clock signal CLK1 may be input to a fourth input terminal IN4 of the (k+2)th stage circuit ST3, ST6, . . . .

The first clock signal CLK1, the third clock signal CLK3, and the fifth clock signal CLK5 may be signals which have the same cycle and have different phases as shown in FIG. 4. Each of the first clock signal CLK1, the third clock signal CLK3, and the fifth clock signal CLK5 may have a phase difference of about 120 degrees. In an example, the third clock signal CLK3 may have a phase which is different by about 120 degrees from a phase of the first clock signal CLK1. In an example, the fifth clock signal CLK5 may have a phase which is different by about 120 degrees from the phase of the third clock signal CLK3 and is different by about 240 degrees from the phase of the first clock signal CLK1.

The first clock signal CLK1 may have the same cycle and phase as the first carry clock signal CR_CLK1. The third clock signal CLK3 may have the same cycle and phase as the third carry clock signal CR_CLK3. The fifth clock signal CLK5 may have the same cycle and phase as the fifth carry clock signal CR_CLK5.

A carry clock signal CR_CLK may be used to output a carry signal CR in each of the stage circuits ST1 to ST6. A clock signal CLK may be used to output a scan signal SS in each of the stage circuits ST1 to ST6. By separately using the carry clock signal CR_CLK and the clock signal CLK, the width of a scan signal, and the like, may be efficiently controlled.

In an embodiment, when the carry clock signal CR_CLK and the clock signal CLK have the same width and the like as the scan signal and the carry signal, only one of the carry clock signal CR_CLK and the clock signal CLK may be used. In an example, the first carry clock signal CR_CLK1 may be replaced with the first clock signal CLK1, the third carry clock signal CR_CLK3 may be replaced with the third clock signal CLK3, and the fifth carry clock signal CR_CLK5 may be replaced with the fifth clock signal CLK5.

The first clock signal CLK1, the third clock signal CLK3, or the fifth clock signal CLK5 may be input to the fifth input terminal IN5. In an example, the fifth clock signal CLK5 may be input to a fifth input terminal IN5 of the kth stage circuit ST1, ST4, . . . . In an example, the first clock signal CLK1 may be input to a fifth input terminal IN5 of the (k+1)th stage circuit ST2, ST5, . . . . In an example, the third clock signal CLK3 may be input to a fifth input terminal IN5 of the (k+2)th stage circuit ST3, ST6, . . . .

A first power source VGH may be input to the first power input terminal VIN1, a second power source VGL1 may be input to the second power input terminal VIN2, and a third power source VGL2 may be input to the third power input terminal VIN3. The first power source VGH may be set to a gate-on voltage such that transistors can be turned on, and each of the second power source VGL1 and the third power source VGL2 may be set to a gate-off voltage such that the transistors can be turned off. In an example, the first power source VGH may be set to a logic high voltage, and each of the second power source VGL1 and the third power source VGL2 may be set to a logic low voltage. The second power source VGL1 may have a voltage higher than a voltage of the third power source VGL2. However, the present disclosure is not limited thereto. For example, in an embodiment, the second power source VGL1 may be set to the same voltage as the third power source VGL2. The third power source VGL2 may be replaced with the second power source VGL1.

A scan signal SS may be output to the first output terminal OUT1. An enable scan signal SS may be set to a logic high voltage, and a disable scan signal SS may be set to a logic low voltage.

An emission control signal EM may be output to the second output terminal OUT2. A disable emission control signal EM may be set to a logic low voltage, and an enable emission control signal EM may be set to a logic high voltage. A disable emission control signal EM output from a specific stage circuit may overlap with an enable scan signal SS output from the specific stage circuit, and have a wide width.

A carry signal CR may be output to the third output terminal OUT3. The carry signal may have a logic high voltage. A carry signal CR (or enable carry signal) output from a specific stage circuit may overlap with an enable scan signal SS output from the specific stage circuit.

Figure 5:
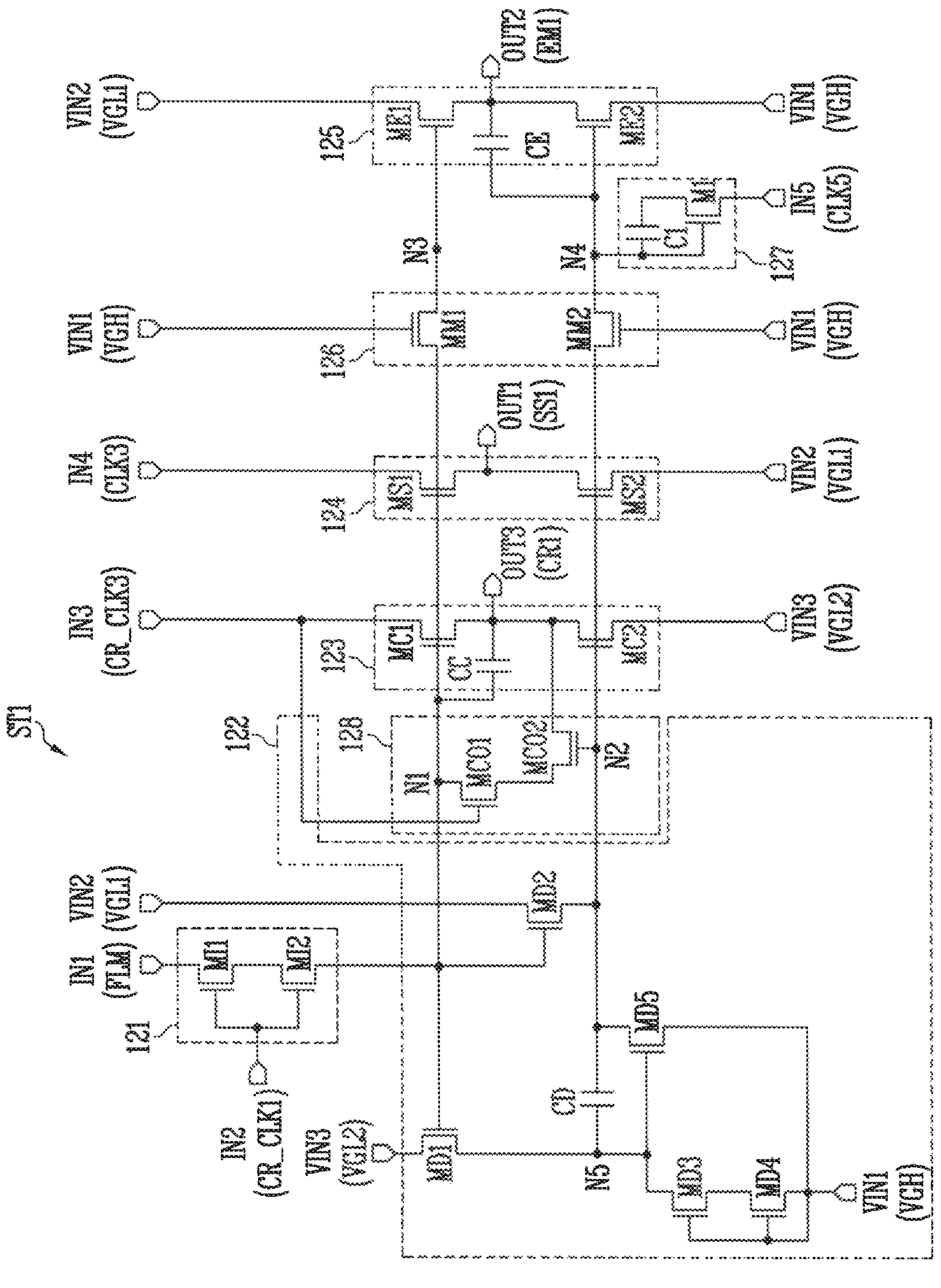
FIG. 5 is a diagram illustrating an embodiment of the stage circuit shown in FIG. 3.

FIG. 5 is a diagram illustrating an embodiment of the stage circuit shown in FIG. 3. For convenience of description, only the first stage circuit ST1 is illustrated in FIG. 5.

Referring to FIG. 5, the first stage circuit ST1 according to an embodiment of the present disclosure may include an input unit 121 (also referred to as an input circuit), a driver 122 (also referred to as a driver circuit), a first output unit 123 (also referred to as a first output circuit), a second output unit 124 (also referred to as a second output circuit), a third output unit 125 (also referred to as a third output circuit), a voltage maintenance unit 126 (also referred to as a voltage maintenance circuit), a first voltage controller 127 (also referred to as a first voltage controller circuit), and a second voltage controller 128 (also referred to as a second voltage controller circuit).

The input unit 121 may be disposed between a first input terminal IN1 and a first node N1, and control an electrical connection between the first input terminal IN1 and the first node N1, corresponding to the first carry clock signal CR_CLK1 input to a second input terminal IN2. To this end, the input unit 121 may include a first input transistor M11 and a second input transistor M12.

The first input transistor M11 and the second input transistor M12 may be connected in series between the first input terminal IN1 and the first node N1. A gate electrode of each of the first input transistor M11 and the second input transistor M12 may be connected to the second input terminal IN2. The first input transistor M11 and the second input transistor M12 may be turned on when the first carry clock signal CR_CLK1 having a high level is input to the second input terminal IN2, and the first input terminal IN1 and the first node N1 may be electrically connected to each other.

The driver 122 may control a voltage of each of the first node N1 and a second node N2, corresponding to the start signal FLM or the carry signal CR, which is input from the input unit 121. The driver 122 may be connected to a first power input terminal VIN1, a second power input terminal VIN2, and a third power input terminal VIN3. The driver 122 may include a first driving transistor MD1, a second driving transistor MD2, a third driving transistor MD3, a fourth driving transistor MD4, a fifth driving transistor MD5, and a capacitor CD.

The first driving transistor MD1 may be connected between the third power input terminal VIN3 and a fifth node N5. A gate electrode of the first driving transistor MD1 may be connected to the first node N1. The first driving transistor MD1 may control an electrical connection between the third power input terminal VIN3 and the fifth node N5, corresponding to the voltage of the first node N1.

The second driving transistor MD2 may be connected between the second power input terminal VIN2 and the second node N2. A gate electrode of the second driving transistor MD2 may be connected to the first node N1. The second driving transistor MD2 may control an electrical connection between the second power input terminal VIN2 and the second node N2, corresponding to the voltage of the first node N1.

The third driving transistor MD3 and the fourth driving transistor MD4 may be connected in series between the fifth node N5 and the first power input terminal VIN1. A gate electrode of each of the third driving transistor MD3 and the fourth driving transistor MD4 may be connected to the first power input terminal VIN1. The fourth driving transistor MD4 may be diode-connected such that a current can be supplied from the first power input terminal VIN1 to the third driving transistor MD3. The third driving transistor MD3 may be diode-connected such that a current can be supplied from the fourth driving transistor MD4 to the fifth node N5.

The fifth driving transistor MD5 may be connected between the second node N2 and the first power input terminal VIN1. A gate electrode of the fifth driving transistor MD5 may be connected to the fifth node N5. The fifth driving transistor MD5 may control an electrical connection between the first power input terminal VIN1 and the second node N2, corresponding to a voltage of the fifth node N5.

The capacitor CD may be connected between the fifth node N5 and the second node N2. The capacitor CD may store a voltage between the fifth node N5 and the second node N2.

The first output unit 123 may output the carry signal CR1 to a third output terminal OUT3, corresponding to the voltage of each of the first node N1 and the second node N2. The first output unit 123 may be connected to a third input terminal IN3 and the third power input terminal VIN3. The first output unit 123 may include a first carry transistor MC1, a second carry transistor MC2, and a carry capacitor CC.

The first carry transistor MC1 may be connected between the third input terminal IN3 and the third output terminal OUT3. A gate electrode of the first carry transistor MC1 may be connected to the first node N1. The first carry transistor MC1 may control an electrical connection between the third input terminal IN3 and the third output terminal OUT3 while being turned on or turned off corresponding to the voltage of the first node N1.

The second carry transistor MC2 may be connected between the third power input terminal VIN3 and the third output terminal OUT3. A gate electrode of the second carry transistor MC2 may be connected to the second node N2. The second carry transistor MC2 may control an electrical connection between the third output terminal OUT3 and the third power input terminal VIN3, corresponding to the voltage of the second node N2.

The carry capacitor CC may be connected between the first node N1 and the third output terminal OUT3. The carry capacitor CC may be driven as a coupling capacitor, and control the voltage of the first node N1, corresponding to a voltage of the third output terminal OUT3.

The second output unit 124 may output the scan signal SS1 to a first output terminal OUT1, corresponding to the voltage of each of the first node N1 and the second node N2. The second output unit 124 may be connected to a fourth input terminal IN4 and the second power input terminal VIN2. The second output unit 124 may include a first scan transistor MS1 and a second scan transistor MS2.

The first scan transistor MS1 may be connected between the fourth input terminal IN4 and the first output terminal OUT1. A gate electrode of the first scan transistor MS1 may be connected to the first node N1. The first scan transistor MS1 may control an electrical connection between the fourth input terminal IN4 and the first output terminal OUT1 while being turned on or turned off corresponding to the voltage of the first node N1.

The second scan transistor MS2 may be connected between the second power input terminal VIN2 and the first output terminal OUT1. A gate electrode of the second scan transistor MS2 may be connected to the second node N2. The second scan transistor MS2 may control an electrical connection between the first output terminal OUT1 and the second power input terminal VIN2, corresponding to the voltage of the second node N2.

The third output unit 125 may output the emission control signal EM1 to a second output terminal OUT2, corresponding to a voltage of each of a third node N3 and a fourth node N4. The third node N3 may be electrically connected to the first node N1, and the fourth node N4 may be electrically connected to the second node N2. The third output unit 125 may be connected to the second power input terminal VIN2 and the first power input terminal VIN1. The third output unit 125 may include a first emission transistor ME1, a second emission transistor ME2, and an emission capacitor CE.

The first emission transistor ME1 may be connected between the second power input terminal VIN2 and the second output terminal OUT2. A gate electrode of the first emission transistor ME1 may be connected to the third node N3. The first emission transistor ME1 may control an electrical connection between the second power input terminal VIN2 and the second output terminal OUT2 while being turned on or turned off corresponding to the voltage of the third node N3.

The second emission transistor ME2 may be connected between the first power input terminal VIN1 and the second output terminal OUT2. A gate electrode of the second emission transistor ME2 may be connected to the fourth node N4. The second emission transistor ME2 may control an electrical connection between the first power input terminal VIN1 and the second output terminal OUT2 while being turned on or turned off corresponding to the voltage of the fourth node N4.

The emission capacitor CE may be connected between the fourth node N4 and the second output terminal OUT2. The emission capacitor CE may store a voltage between the fourth node N4 and the second output terminal OUT2.

The first voltage controller 127 may control the voltage of the fourth node N4, corresponding to the fifth clock signal CLK5 supplied to a fifth input terminal IN5. To this end, the first voltage controller 127 may include a first transistor M1 and a first capacitor C1.

The first transistor M1 may be connected between a first electrode of the first capacitor C1 and the fifth input terminal IN5. A gate electrode of the first transistor M1 may be connected to the fourth node N4. The first transistor M1 may control an electrical connection between the fifth input terminal IN5 and the first electrode of the first capacitor C1 while being turned on or turned off corresponding to the voltage of the fourth node N4.

A second electrode of the first capacitor C1 may be connected to the fourth node N4, and the first electrode of the first capacitor C1 may be connected to the first transistor M1. The first capacitor C1 may be driven as a coupling capacitor, and control the voltage of the fourth node N4, corresponding to a voltage supplied from the first transistor M1 (e.g., the fifth clock signal CL5).

The second voltage controller 128 may control the voltage of the third output terminal OUT3, corresponding to the third carry clock signal CR_CLK3 input to the second node N2 and the third input terminal IN3. To this end, the second voltage controller 128 may include a first control transistor MCO1 and a second control transistor MCO2.

The first control transistor MCO1 and the second control transistor MCO2 may be connected in series between the first node N1 and the third output terminal OUT3. A gate electrode of the first control transistor MCO1 may be connected to the third input terminal IN3. The first control transistor MCO1 may be turned on when the third carry clock signal CR_CLK3 having a high level is input to the third input terminal IN3. A gate electrode of the second control transistor MCO2 may be connected to the second node N2. The second control transistor MCO2 may be turned on or turned off corresponding to the voltage of the second node N2.

The voltage maintenance unit 126 may maintain the voltage of the third node N3 as a voltage about equal to or lower than the voltage of the first power source VGH even when the voltage of the first node N1 exceeds the voltage of the first power source VGH. The voltage maintenance unit 126 may maintain the voltage of the second node N2 as a voltage about equal to or lower than the voltage of the first power source VGH even when the voltage of the fourth node N4 exceeds the voltage of the first power source VGH. To this end, the voltage maintenance unit 126 may include a first maintenance transistor MM1 and a second maintenance transistor MM2.

The first maintenance transistor MM1 may be connected between the first node N1 and the third node N3. A gate electrode of the first maintenance transistor MM1 may be connected to the first power input terminal VIN1. The first maintenance transistor MM1 may be set to be in a turn-on state, corresponding to the voltage of the first power source VGH input to the first power input terminal VIN1. When the first maintenance transistor MM1 is set to be in the turn-on state, the first node N1 and the third node N3 may be electrically connected to each other.

The second maintenance transistor MM2 may be connected between the second node N2 and the fourth node N4. A gate electrode of the second maintenance transistor MM2 may be connected to the first power input terminal VIN1. The second maintenance transistor MM2 may be set to be in a turn-on state, corresponding to the voltage of the first power source VGH input to the first power input terminal VIN1. When the second maintenance transistor MM2 is set to be in the turn-on state, the second node N2 and the fourth transistor M4 may be electrically connected to each other.

In an embodiment, each of the transistors MI1, MI2, MD1 to MD5, MC1, MC2, MS1, MS2, ME1, ME2, MCO1, MCO2, MM1, MM2, and M1 included in the first stage circuit ST1 may be an N-type transistor. In an example, each of the transistors MI1, MI2, MD1 to MD5, MC1, MC2, MS1, MS2, ME1, ME2, MCO1, MCO2, MM1, MM2, and M1 may be an oxide semiconductor transistor (e.g., an NMOS transistor), and include an oxide semiconductor layer as an active layer. Accordingly, a gate-on voltage at which the transistors MI1, MI2, MD1 to MD5, MC1, MC2, MS1, MS2, ME1, ME2, MCO1, MCO2, MM1, MM2, and M1 are turned on may have a high level (or logic high level).

As described above, according to embodiments of the present disclosure, a stage circuit may include various components including, for example, an input unit, a driver, multiple output units, a voltage maintenance unit, and voltage controllers. The input unit, which includes a plurality of transistors, may connect the input terminals to specific nodes based on the carry clock signal. The driver may adjust node voltages according to input signals, while the output units may supply signals (e.g., scan, carry, and emission control signals) to designated terminals. Additionally, voltage controllers may regulate output terminals in sync with clock signals, and a voltage maintenance unit may allow for the implementation of stable voltages across nodes even when exceeding specific power levels. This configuration may provide controlled signal transmission and effective power management.

Figure 6:
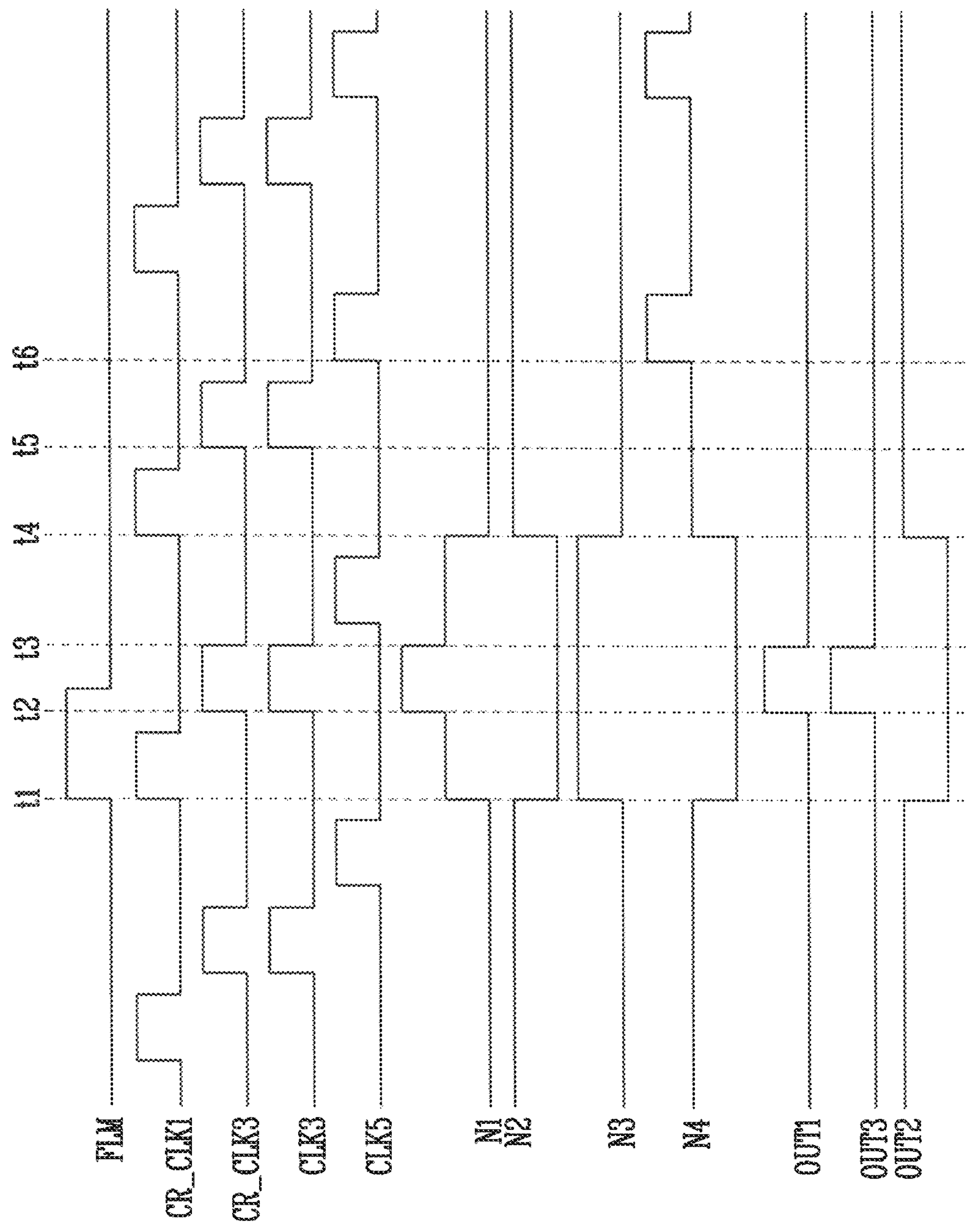
FIG. 6 is a waveform diagram illustrating an embodiment of a method of driving the stage circuit shown in FIG. 5.

FIG. 6 is a waveform diagram illustrating an embodiment of a method of driving the stage circuit shown in FIG. 5.

Referring to FIG. 6, at a first time t1, a high-level start signal FLM may be input to the first input terminal IN1. Also, at the first time t1, a high-level first carry clock signal CR_CLK1 may be input to the second input terminal IN2.

When the high-level first carry clock signal CR_CLK1 is input to the second input terminal IN2, the first input transistor MI1 and the second input transistor MI2 may be turned on. When the first input transistor MI1 and the second input transistor MI2 are turned on, a high-level voltage may be supplied to the first node N1 and the third node N3. The voltage of each of the first node N1 and the third node N3 may be set to a high level, and the first driving transistor MD1, the second driving transistor MD2, the first carry transistor MC1, the first scan transistor MS1, and the first emission transistor ME1 may be turned on.

When the first driving transistor MD1 is turned on, the voltage of the third power source VGL2 may be supplied to the fifth node N5 from the third power source input terminal VIN3. When the voltage of the third power source VGL2 is supplied to the fifth node N5, the fifth driving transistor MD5 may be set to be in a turn-off state.

Meanwhile, the voltage of the first power source VGH may be supplied to the fifth node N5 via the third driving transistor MD3 and the fourth driving transistor MD4, which are diode-connected. Since the voltage of the third power source VGL2 is supplied to the fifth node N5 via the first driving transistor MD1 and the voltage of the first power source VGH is supplied via the third driving transistor MD3 and the fourth driving transistor MD4, which are diode-connected, the fifth node N5 may stably maintain the voltage of the third power source VGL2.

When the second driving transistor MD2 is turned on, the second power input terminal VIN2 and the second node N2 may be electrically connected to each other, and accordingly, the voltage (or a low-level voltage) of the second power VGL1 may be supplied to the second node N2 and the fourth node N4. When the voltage of the second power source VGL1 is supplied to the second node N2, the second control transistor MCO2, the second carry transistor MC2, the second scan transistor MS2, the second emission transistor ME2, and the first transistor M1 may be turned off.

When the first carry transistor MC1 is turned on, the third input terminal IN3 and the third output terminal OUT3 may be electrically connected to each other. At the first time t1, the third carry clock signal CR_CLK3 input to the third input terminal IN3 may be set to a low level, and accordingly, the third output terminal OUT may also maintain the low level voltage.

When the first scan transistor MS1 is turned on, the fourth input terminal IN4 and the first output terminal OUT1 may be electrically connected to each other. At the first time t1, the third clock signal CLK3 input to the fourth input terminal IN4 may be set to the low level, and accordingly, the first output terminal OUT1 may maintain the low level voltage.

When the first emission transistor ME1 is turned on, the second power input terminal VIN2 and the second output terminal OUT2 may be electrically connected to each other. The voltage of the second power source VGL1 may be output to the second output terminal OUT2. The voltage of the second power source VGL1 output to the second output terminal OUT2 may be supplied as a disable emission control signal EM1 to the emission control line EL1.

At a second time t2, a high-level third carry clock signal CR_CLK3 may be input to the third input terminal IN3, and a high-level third clock signal CLK3 may be input to the fourth input terminal IN4.

The high-level third carry clock signal CR_CLK3 input to the third input terminal IN3 may be supplied to the third output terminal OUT3. The high-level third carry clock signal CR_CLK3 supplied to the third output terminal OUT3 may be supplied as a carry signal CR1 to a next stage (e.g., the second stage ST2).

When the high-level third carry clock signal CR_CLK3 is supplied to the third output terminal OUT3, the voltage of the first node N1 may be increased to a voltage about equal to or higher than the voltage of the first power source VGH by the carry capacitor CC. The third node N3 may maintain a voltage about equal to or lower than the voltage of the first power source VGH by the first maintenance transistor MM1.

The high-level third clock signal CLK3 input to the fourth input terminal IN4 may be supplied to the first output terminal OUT1. The high-level third clock signal CLK3 supplied to the first output terminal OUT1 may be supplied to the enable scan signal SS1 to the scan line SL1.

According to embodiments of the present disclosure, the carry clock signal CR_CLK3 used to generate the carry signal CR and the clock signal CLK3 used to generate the scan signal SS may be separated from each other. Thus, although the load of a scan line may suddenly increase, the carry signal CR can be stably generated, and accordingly, driving stability can be achieved. In addition, the width of the scan signal SS may be controlled regardless of the carry signal CR. However, the carry clock signal CR_CLK3 and the clock signal CLK3 may be used as the same signal, depending on the implementation. The carry clock signal CR_CLK3 (or the clock signal CLK3) may be omitted.

For example, according to embodiments of the present disclosure, the carry clock signal CR_CLK3, used to generate the carry signal CR, and the clock signal CLK3, used to generate the scan signal SS, are designed to operate independently. This separation allows for the carry signal CR to be generated stably, even if there is a sudden increase in the load on a scan line, thereby maintaining stable operation. Additionally, this separation allows for independent control of the scan signal SS width, regardless of the carry signal CR.

At a third time t3, a low-level third carry clock signal CR_CLK3 may be input the third input terminal IN3, and a low-level third clock signal CLK3 may be input to the fourth input terminal IN4.

The low-level third carry clock signal CR_CLK3 input to the third input terminal IN3 may be supplied to the third output terminal OUT3. Then, the output of the carry signal CR1 may be suspended (or the carry signal CR1 having a low voltage may be supplied).

The low-level third clock signal CLK3 input to the fourth input terminal IN4 may be supplied to the first output terminal OUT1. The low-level third clock signal CLK3 supplied to the first output terminal OUT1 may be supplied as a disable scan signal SS1 to the scan line SL1.

At a fourth time t4, the high-level first carry clock signal CR_CLK1 may be input to the second input terminal IN2. A low-level voltage (or a low-level start signal FLM) may be input to the first input terminal.

When the high-level first carry clock signal CR_CLK1 is input to the second input terminal IN2, the first input transistor MI1 and the second input transistor MI2 may be turned on. When the first input transistor MI1 and the second input transistor MI2 are turned on, the low-level voltage may be supplied to the first node N1. When the voltage of the first node N1 is set to a low level, the first driving transistor MD1, the second driving transistor MD2, the first carry transistor MC1, the first scan transistor MS1, and the first emission transistor ME1 may be turned off.

Meanwhile, the fifth node N5 may be supplied with the voltage of the first power source VGH via the third driving transistor MD3 and the fourth driving transistor MD4, which are diode-connected. Since the first driving transistor MD1 is turned off, the fifth node N5 may maintain the voltage of the first power source VGH.

When the voltage of the fifth node N5 is set as the voltage of the first power source VGH, the fifth driving transistor MD5 may be turned on. When the fifth driving transistor MD5 is turned on, the second control transistor MCO2, the second carry transistor MC2, the second scan transistor MS2, the second emission transistor ME2, and the first transistor M1 may be turned on.

When the second carry transistor MC2 is turned on, the voltage of the third power source VGL2 from the third power input terminal VIN3 may be supplied to the third output terminal OUT3. Thus, the third output terminal OUT3 may maintain the low-level voltage.

When the second scan transistor MS2 is turned on, the voltage of the second power source VGL1 from the second power input terminal VIN2 may be supplied to the first output terminal OUT1. Therefore, the first output terminal OUT1 may maintain the low-level voltage. The voltage of the second power source VGL1 output to the first output terminal OUT1 may be supplied as the disable scan signal SS1 to the scan line SL1.

The third power source VGL2 may be set to a voltage lower than the voltage of the second power source VGL1. When the third power source VGL2 is set to a voltage lower than the voltage of the second power source VGL1, a high-level carry signal CR can be prevented from being output even when a predetermined leakage current is generated. In an embodiment of the present disclosure, the third power source VGL2 may be set to the same voltage as the second power source VGL1. The third power source VGL2 may be replaced with the second power source VGL1.

When the second emission transistor ME2 is turned on, the voltage of the first power source VGH from the first power input terminal VIN may be supplied to the second output terminal OUT2. Therefore, the second output terminal OUT2 may maintain a high-level voltage. The voltage of the first power source VGH output to the second output terminal OUT2 may be supplied as an enable emission control signal EM1 to the emission control line EL1.

At a fifth time t5, the high-level third carry clock signal CR_CLK3 may be input to the third input terminal IN3. When the high-level third carry clock signal CR_CLK3 is input to the third input terminal IN3, the first control transistor MCO1 may be turned on. Since the second control transistor MCO2 maintains a turn-on state, the first node N1 and the third output terminal OUT3 may be electrically connected to each other.

In an example, whenever the high-level third carry clock signal CR_CLK3 is input after the fifth time t5, the first node N1 and the third output terminal OUT3 may be electrically connected to each other. Then, the third output terminal OUT3 may be periodically supplied with a low-level voltage (e.g., the voltage of the first node N1). As a result, driving stability can be achieved (or the high-level carry signal CR can be prevented from being unnecessarily generated).

At a sixth time t6, a high-level fifth clock signal CLK5 may be input to the fifth input terminal IN5. Since the first transistor M1 is set to be in a turn-on state, the voltage of the high-level fifth clock signal CLK5 may be supplied to the first electrode of the first capacitor C1. The voltage of the fourth node N4 may be increased by coupling of the first capacitor C1. When the voltage of the fourth node N4 is increased, the second emission transistor ME2 connected to the fourth node N4 may stably maintain a turn-on state. The voltage of the fourth node N4 may be periodically increased after the sixth time t6. As a result, driving stability can be achieved. Additionally, although the voltage of the fourth node N4 is increased, the voltage of the second node N2 may be maintained lower than the voltage of the fourth node N4 by the second maintenance transistor MM2.

Meanwhile, the second stage circuit ST2 may receive the first carry signal CR1 through a first input terminal IN1, and receive the third carry clock signal CR_CLK3 through a second input terminal IN2. The first carry signal CR1 may be supplied to overlap with the high-level third carry clock CR_CLK3, and accordingly, the scan signal SS2 and the emission control signal EM2 may be generated.

The third to sixth stage circuits ST3 to ST6 may also generate the scan signals SS3 to SS6 and the emission control signals EM3 to EM6 in the same manner as described above.

Figure 7:
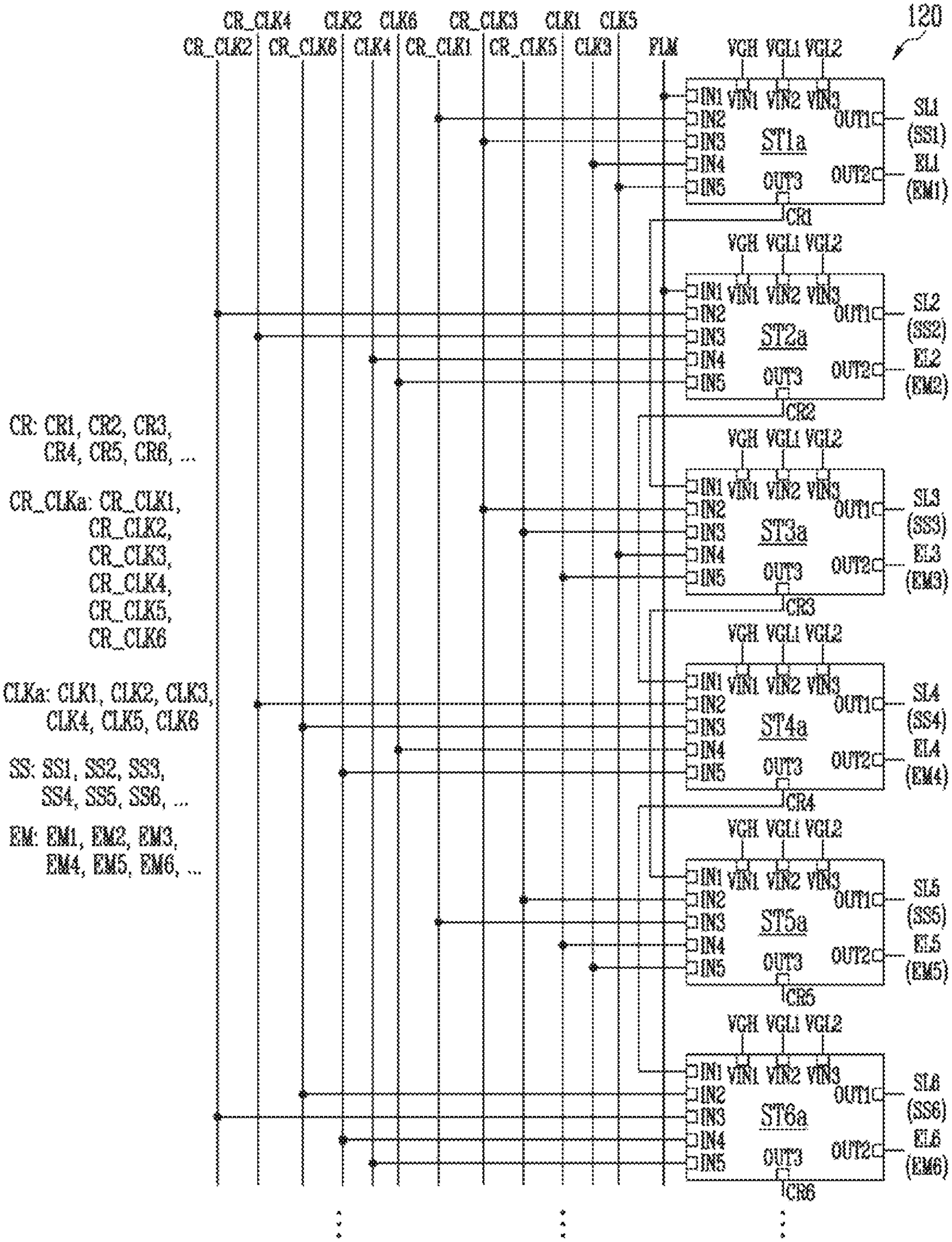
FIG. 7 is a diagram illustrating a stage circuit according to embodiments of the present disclosure.
Figure 8:
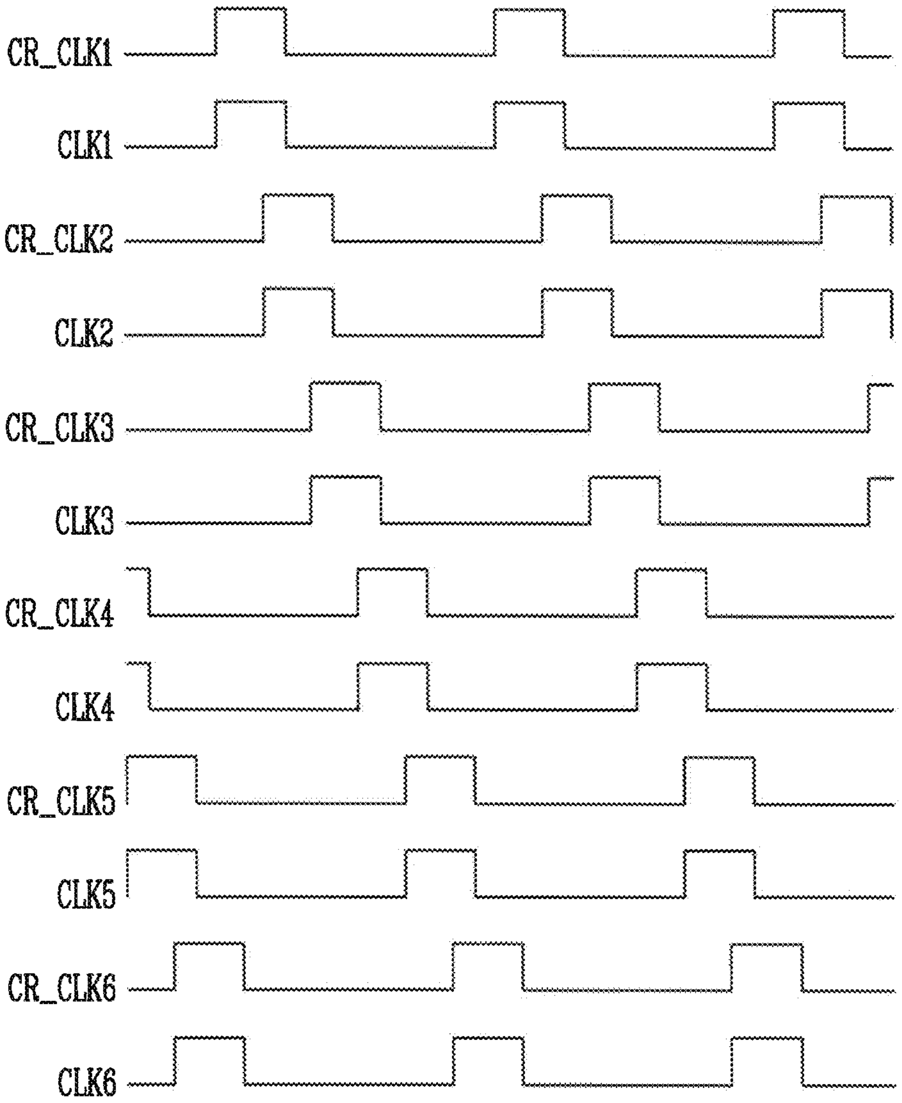
FIG. 8 is a diagram illustrating an embodiment of carry clock signals and clock signals, which are shown in FIG. 7.

FIG. 7 is a diagram illustrating a stage circuit according to embodiments of the present disclosure. FIG. 8 is a diagram illustrating an embodiment of carry clock signals and clock signals, which are shown in FIG. 7.

Referring to FIG. 7, the scan driver 120 may include a plurality of stage circuits ST1*a*, ST2*a*, ST3*a*, ST4*a*, ST5*a*, ST6*a*, . . . . Each of the stage circuits ST1*a* to ST6*a* may be connected to any one of the scan lines SL1 to SLn and any one of the emission control lines EL1 to ELn.

In an example, a first stage circuit ST1*a* may be electrically connected to a scan line SL1 and an emission control line EL1, and supply a scan signal SS1 and an emission control signal EM1 respectively to the scan line SL1 and the emission control line EL1. A second stage circuit ST2*a* may be electrically connected to a scan line SL2 and an emission control line EL2, and supply a scan signal SS2 and an emission control signal EM2 respectively to the scan line SL2 and the emission control line EL2.

A third stage circuit ST3*a* may be electrically connected to a scan line SL3 and an emission control line EL3, and supply a scan signal SS3 and an emission control signal EM3 respectively to the scan line SL3 and the emission control line EL3. A fourth stage circuit ST4*a* may be electrically connected to a scan line SL4 and an emission control line EL4, and supply a scan signal SS4 and an emission control signal EM4 respectively to the scan line SL4 and the emission control line EL4.

A fifth stage circuit ST5*a* may be electrically connected to a scan line SL5 and an emission control line EL5, and supply a scan signal SS5 and an emission control signal EM5 respectively to the scan line SL5 and the emission control line EL5. A sixth stage circuit ST6*a* may be electrically connected to a scan line SL6 and an emission control line EL6, and supply a scan signal SS6 and an emission control signal EM6 respectively to the scan line SL6 and the emission control line EL6.

Each of the stage circuits ST1*a* to ST6*a* may include a first input terminal IN1, a second input terminal IN2, a third input terminal IN3, a fourth input terminal IN4, a fifth input terminal IN5, a first power input terminal VIN1, a second power input terminal VIN2, a third power input terminal VIN3, a first output terminal OUT1, a second output terminal OUT2, and a third output terminal OUT3.

A start signal FLM or a carry signal CR (or CR1, CR2, CR3, CR4, CR5, CR6, . . . ) of a previous stage circuit may be input to the first input terminal IN1. In an example, the start signal FLM may be input to a first input terminal IN1 of each of the first stage circuit ST1*a* and the second stage circuit ST2*a*.

A carry signal CR1, CR3, . . . of a previous odd-numbered stage circuit may be input to a first input terminal IN1 of an odd-numbered stage circuit ST3*a*, ST5*a*, . . . . A carry signal CR2, CR4, . . . of a previous even-numbered stage circuit may be input to a first input terminal IN1 of an even-numbered stage circuit ST4*a*, ST6*a*, . . . .

A first carry clock signal CR_CLK1, a third carry clock signal CR_CLK3, or a fifth carry clock signal CR_CLK5 may be input to a second input terminal IN2 of an odd-numbered stage circuit ST1*a*, ST3*a*, ST5*a*, . . . . In an example, the first carry clock signal CR_CLK1 may be input to a second input terminal IN2 of a pth (where p is 1, 7, . . . ) stage circuit ST1*a*, . . . . In an example, the third carry clock signal CR_CLK3 may be input to a second input terminal IN2 of a (p+2)th stage circuit ST3*a*, . . . . In an example, the fifth carry clock signal CR_CLK5 may be input to a second input terminal IN2 of a (p+4)th stage circuit ST5*a*, . . . .

A second carry clock signal CR_CLK2, a fourth carry clock signal CR_CLK4, or a sixth carry clock signal CR_CLK6 may be input to a second input terminal IN2 of an even-numbered stage circuit ST2*a*, ST4*a*, ST6*a*, . . . . In an example, the second carry clock signal CR_CLK2 may be input to a second input terminal IN2 of a (p+1)th stage circuit ST2*a*, . . . . In an example, the fourth carry clock signal CR_CLK4 may be input to a second input terminal IN2 of a (p+3)th stage circuit ST4*a*, . . . . In an example, the sixth carry clock signal CR_CLK6 may be input to a second input terminal IN2 of a (p+5)th stage circuit ST6*a*, . . . .

The first carry clock signal CR_CLK1, the second carry clock signal CR_CLK2, the third carry clock signal CR_CLK3, the fourth carry clock signal CR_CLK4, the fifth carry clock signal CR_CLK5, and the sixth carry clock signal CR_CLK6 may be signals which have the same cycle and have different phases as shown in FIG. 8. The first carry clock signal CR_CLK1, the second carry clock signal CR_CLK2, the third carry clock signal CR_CLK3, the fourth carry clock signal CR_CLK4, the fifth carry clock signal CR_CLK5, and the sixth carry clock signal CR_CLK6 may have a phase difference of about 60 degrees from each other, and be sequentially supplied.

The first carry clock signal CR_CLK1, the third carry clock signal CR_CLK3, or the fifth carry clock signal CR_CLK5 may be input to a third input terminal IN3 of the odd-numbered stage circuit ST1*a*, ST3*a*, ST5*a*, . . . . In an example, the third carry clock signal CR_CLK3 may be input to a third input terminal IN3 of the pth stage circuit ST1*a*, . . . . In an example, the fifth carry clock signal CR_CLK5 may be input to a third input terminal IN3 of the (p+2)th stage circuit ST3*a*, . . . . In an example, the first carry clock signal CR_CLK1 may be input to a third input terminal IN3 of the (p+4)th stage circuit ST5*a*, . . . .

The second carry clock signal CR_CLK2, the fourth carry clock signal CR_CLK4, or the sixth carry clock signal CR_CLK6 may be input to a third input terminal IN3 of the even-numbered stage circuit ST2*a*, ST4*a*, ST6*a*, . . . . In an example, the fourth carry clock signal CR_CLK4 may be input to a third input terminal IN3 of the (p+1)th stage circuit ST2*a*, . . . . In an example, the sixth carry clock signal CR_CLK6 may be input to a third input terminal IN3 of the (p+3)th stage circuit ST4*a*, . . . . In an example, the second carry clock signal CR_CLK2 may be input to a third input terminal IN3 of the (p+5)th stage circuit ST6*a*, . . . .

A first clock signal CLK1, a third clock signal CLK3, or a fifth clock signal CLK5 may be input to a fourth input terminal IN4 of the odd-numbered stage circuit ST1*a*, ST3*a*, ST5*a*, . . . . In an example, the third clock signal CLK3 may be input to a fourth input terminal IN4 of the pth stage circuit ST1*a*, . . . . In an example, the fifth clock signal CLK5 may be input to a fourth input terminal IN4 of the (p+2)th stage circuit ST3*a*, . . . . In an example, the first clock signal CLK1 may be input to a fourth input terminal IN4 of the (p+4)th stage circuit ST5*a*, . . . .

A second clock signal CLK2, a fourth clock signal CLK4, or a sixth clock signal CLK6 may be input to a fourth input terminal IN4 of the even-numbered stage circuit ST2*a*, ST4*a*, ST6*a*, . . . . In an example, the fourth clock signal CLK4 may be input to a fourth input terminal IN4 of the (p+1)th stage circuit ST2*a*, . . . . In an example, the sixth clock signal CLK6 may be input to a fourth input terminal IN4 of the (p+3)th stage circuit ST4*a*, . . . . In an example, the second clock signal CLK2 may be input to a fourth input terminal IN4 of the (p+5)th stage circuit ST6*a*, . . . .

The first clock signal CLK1 may have the same cycle and phase as the first carry clock signal CR_CLK1. The second clock signal CLK2 may have the same cycle and phase as the second carry clock signal CR_CLK2. The third clock signal CLK3 may have the same cycle and phase as the third carry clock signal CR_CLK3. The fourth clock signal CLK4 may have the same cycle and phase as the fourth carry clock signal CR_CLK4. The fifth clock signal CLK5 may have the same cycle and phase as the fifth carry clock signal CR_CLK5. The sixth clock signal CLK6 may have the same cycle and phase as the sixth carry clock signal CR_CLK6.

A carry clock signal CR_CLKa may be used to output a carry signal CR in the stage circuits ST1*a* to ST6*a*. A clock signal CLKa may be used to output a scan signal SS in the stage circuits ST1*a* to ST6*a*. When the carry clock signal CR_CLKa and the clock signal CLKa are separately used, the width of a scan signal, and the like, may be efficiently controlled.

In an embodiment, when the carry clock signal CR_CLKa and the clock signal CLKa have the same width and the like as the scan signal and the carry signal, only one of the carry clock signal CR_CLKa and the clock signal CLKa may be used. In an example, the first carry clock signal CR_CLK1 may be replaced with the first clock signal CLK1, the second carry clock signal CR_CLK2 may be replaced with the second clock signal CLK2, the third carry clock signal CR_CLK3 may be replaced with the third clock signal CLK3, the fourth carry clock signal CR_CLK4 may be replaced with the fourth clock signal CLK4, the fifth carry clock signal CR_CLK5 may be replaced with the fifth clock signal CLK5, and the sixth carry clock signal CR_CLK6 may be replaced with the sixth clock signal CLK6.

The first clock signal CLK1, the third clock signal CLK3, or the fifth clock signal CLK5 may be input to a fifth input terminal IN5 of the odd-numbered stage circuit ST1*a*, ST3*a*, ST5*a*, . . . . In an example, the fifth clock signal CLK5 may be input to a fifth input terminal IN5 of the pth stage circuit ST1*a*, . . . . The first clock signal CLK1 may be input to a fifth input terminal IN5 of the (p+2)th stage circuit ST3*a*, . . . . In an example, the third clock signal CLK3 may be input to a fifth input terminal IN5 of the (p+4)th stage circuit ST5*a*, . . . .

The second clock signal CLK2, the fourth clock signal CLK4, or the sixth clock signal CLK6 may be input to a fifth input terminal IN5 of the even-numbered stage circuit ST2*a*, ST4*a*, ST6*a*, . . . . In an example, the sixth clock signal CLK6 may be input to a fifth input terminal IN5 of the (p+1)th stage circuit ST2*a*, . . . . In an example, the second clock signal CLK2 may be input to a fifth input terminal IN5 of the (p+3)th stage circuit ST4*a*, . . . . In an example, the fourth clock signal CLK4 may be input to a fifth input terminal IN5 of the (p+5)th stage circuit ST6*a*, . . . .

A first power source VGH1 may be input to the first power input terminal VIN1, a second power source VGL1 may be input to the second power input terminal VIN2, and a third power source VGL2 may be input to the third power input terminal VIN3.

The scan signal SS may be output to the first output terminal OUT1. An enable scan signal SS may be set to a logic high voltage, and a disable scan signal SS may be set to a logic low voltage.

An emission control signal EM may be output to the second output terminal OUT2. A disable emission control signal EM may be set to a logic low voltage, and an enable emission control signal EM may be set to a logic high voltage. The disable emission control signal EM output from a specific stage circuit may overlap with the enable scan signal SS output from the specific stage circuit, and have a wide width.

The carry signal CR may be output to the third output terminal OUT3. The carry signal CR may have a logic high voltage.

A circuit configuration of each of the stage circuits ST1*a* to ST6*a* may be substantially identical to the circuit configuration of each of the stage circuits ST1 to ST6 shown in FIG. 5.

Figure 9:
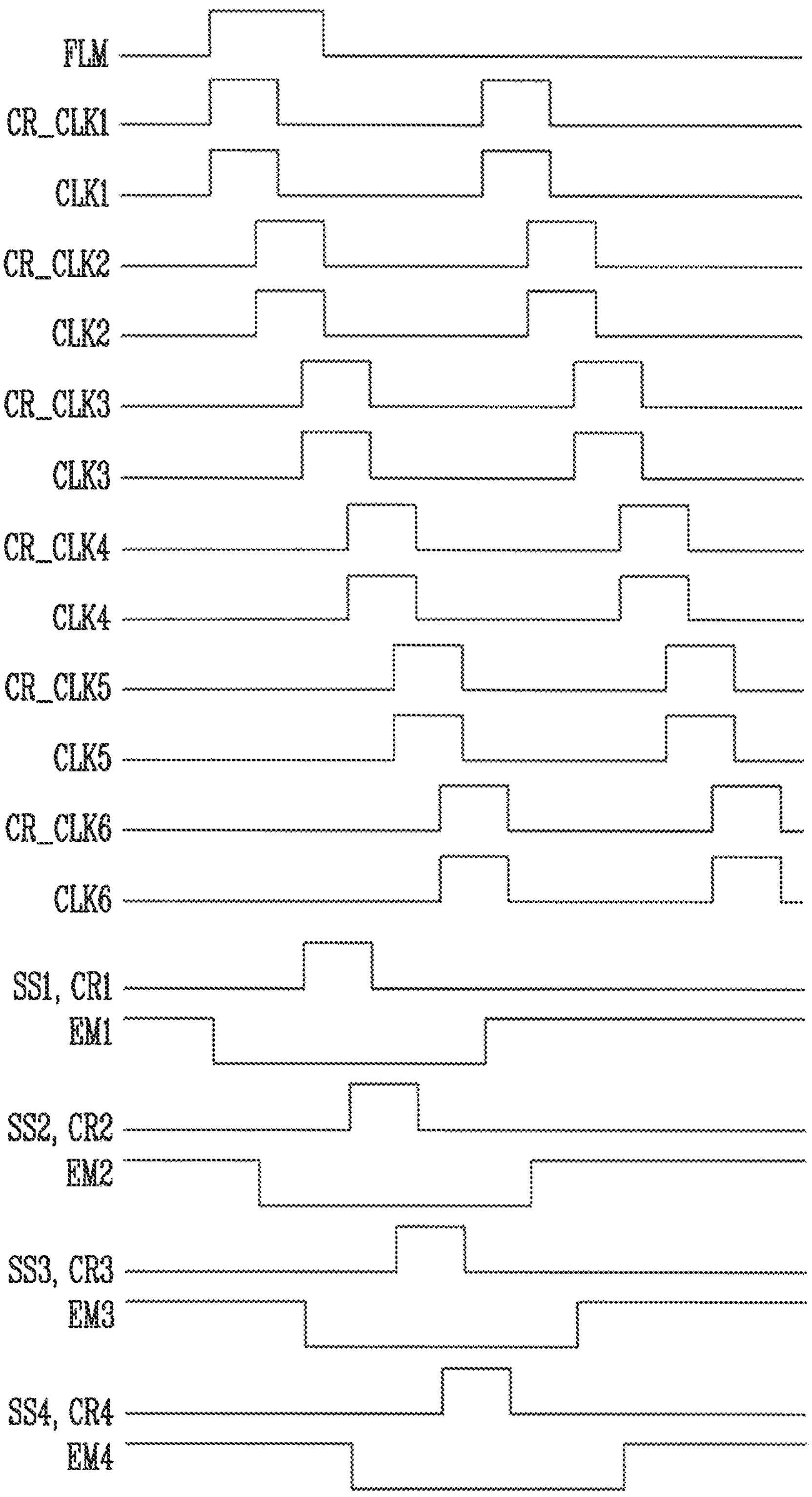
FIG. 9 is a waveform diagram illustrating a process of operating the stage circuit shown in FIG. 7.

FIG. 9 is a waveform diagram illustrating a process of operating the stage circuit shown in FIG. 7.

Referring to FIG. 9, the start signal FLM may be supplied to overlap with the first clock signal CLK (and the first carry clock signal CR_CLK1) and the second clock signal (and the second carry clock signal CR_CLK2).

The first stage circuit ST1*a* may be supplied with a high-level start signal FLM when a high-level first carry clock signal CR_CLK1 is input, and output a disable emission control signal EM1, corresponding to the high-level start signal FLM. Also, the first stage circuit ST1*a* may output a high-level third carry clock signal CR_CLK3 as a carry signal CR1, and output the high-level third clock signal CLK3 as a scan signal SS1.

The third stage circuit ST3*a* may be supplied with the carry signal CR1 when the high-level third carry clock CR_CLK3 is input, and output a disable emission control signal EM3, corresponding to the carry signal CR1. Also, the third stage circuit ST3*a* may output a high-level fifth carry clock signal CR_CLK5 as a carry signal CR3, and output the high-level fifth carry clock signal CR_CLK5 as a scan signal SS3. Each of odd-numbered stage circuits ST5*a*, . . . may output a carry signal CR5, . . . , a scan signal SS5, . . . , and an emission control signal EM5, . . . while repeating the above-described process, corresponding to a carry signal CR3, . . . supplied from a previous odd-numbered stage circuit.

The second stage circuit ST2*a* may be supplied with the high-level start signal FLM when a high-level second carry clock signal CR_CLK2 is input, and output a disable emission control signal EM2, corresponding to the high-level start signal FLM. Also, the second stage circuit ST2*a* may output a high-level fourth carry clock signal CR_CLK4 as a carry signal CR2, and output the high-level fourth carry clock signal CR_CLK4 as a scan signal SS2.

The fourth stage circuit ST4*a* may be supplied with the carry signal CR2 when the high-level fourth carry clock signal CR_CLK4, and output a disable emission control signal EM4, corresponding to the carry signal CR2. Also, the fourth stage circuit ST4*a* may output a high-level sixth carry clock signal CR_CLK6 as a carry signal CR4, and output the high-level sixth carry clock signal CR_CLK6 as a scan signal SS4. Each of even-numbered circuits ST6*a*, . . . may output a carry signal CR6, . . . , a scan signal SS6, . . . , and an emission control signal EM6, . . . by repeating the above-described process, corresponding to a carry signal CR4, . . . supplied from a previous even-numbered stage circuit.

As described above, the stage circuit according to embodiments of the present disclosure may generate emission control signals and scan signals in various forms, using the clock signal CLK or CLKa and the carry clock signal CR_CLK or CR_CLKa, which are supplied to the input terminals IN1 to IN5.

Figure 10:
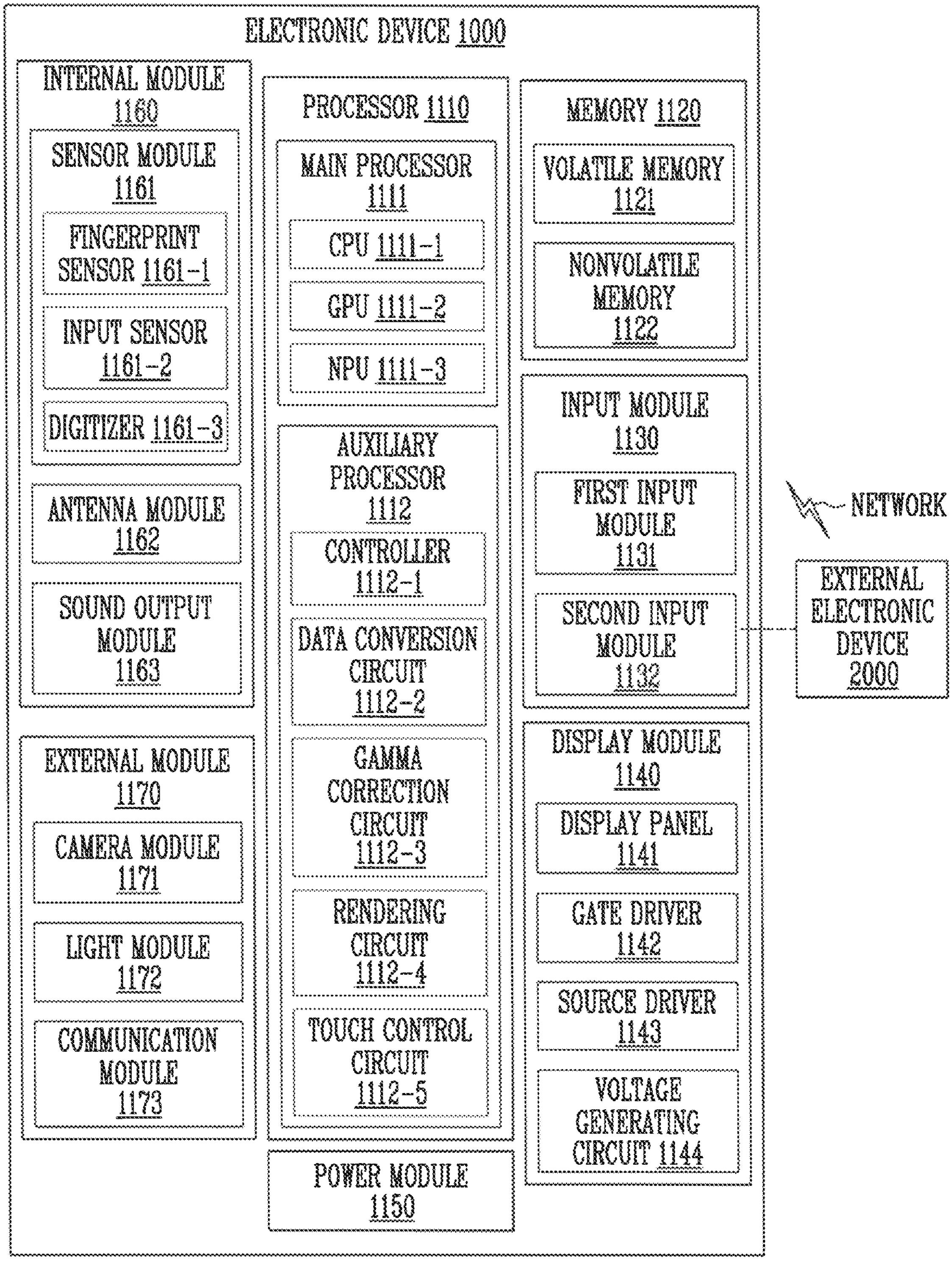
FIG. 10 is a diagram illustrating an electronic device according to embodiments of the present disclosure.

FIG. 10 is a diagram illustrating an electronic device according to embodiments of the present disclosure.

Referring to FIG. 10, the electronic device 1000 according to an embodiment of the present disclosure may output various information through a display module 1140. When a processor 1110 executes an application stored in a memory 1120, the display module 1140 may provide application information to a user through a display panel 1141. The electronic device 1000 may be, for example, a smartphone.

The processor 1110 may acquire an external input through an input module 1130 or a sensor module 1161, and execute an application corresponding to the external input. For example, when the user selects a camera icon (or camera application icon) displayed on the display panel 1141, the processor 1110 may acquire a user input through an input sensor 1161-2, and activate a camera module 1171. The processor 1110 may transfer, to the display module 1140, image data corresponding to a photographed image acquired through the camera module 1171. The display module 1140 may display an image corresponding to the photographed image through the display panel 1141.

In an example, when personal information authentication is executed in the display module 1140, a fingerprint sensor 1161-1 may acquire input fingerprint information as input data. The processor 1110 may compare the input data acquired through the fingerprint sensor 1161-1 with authentication data stored in the memory 1120, and execute an application according to a comparison result. The display module 1140 may display information executed according to a logic of the application through the display panel 1141. The fingerprint sensor 1161-1 may be disposed to acquire fingerprint information in the entire area of the display panel 1141.

In an example, when a music streaming icon displayed on the display module 1140 is selected, the processor 1110 may acquire a user input through the input sensor 1161-2, and activate a music streaming application stored in the memory 1120. When a music play command is input to the music streaming application, the processor 1110 may activate a sound output module 1163, thereby providing the user with sound information which accords with the music play command.

Operations of the electronic device 1000 have been briefly described above. Hereinafter, components of the electronic device 1000 will be described in further detail. Some of the components of the electronic device 1000 to be described may be integrated to be provided as one component, or may be separated into two or more components.

The electronic device 1000 may communicate with an external electronic device 2000 through a network (e.g., a short-range wireless communication network or a long-range wireless communication network). According to embodiments, the electronic device 1000 may include the processor 1110, the memory 1120, the input module 1130, the display module 1140, a power module 1150, an internal module 1160, and an external module 1170. According to embodiments, in the electronic device 1000, at least one of the above-described components may be omitted, or one or more other components may be added. According to embodiments, some components (e.g., the sensor module 1161, an antenna module 1162, and/or the sound output module 1163) among the above-described components may be integrated in another component (e.g., the display module 1140).

The processor 1110 may control at least another component (e.g., a hardware or software component) of the electronic device 1000, which is connected to the processor 1110, by executing software, and perform various processing or calculations. According to embodiments, as at least a portion of the data processing and calculations, the processor 1110 may store, in a volatile memory 1121, a command or data, received from another component (e.g., the input module 1130, the sensor module 1161, or a communication module 1173), process the command or data stored in the volatile memory 1121, and store result data in a nonvolatile memory 1122.

The processor 1110 may include a main processor 1111 and an auxiliary processor 1112. The main processor 1111 may include a central processing unit (CPU) 1111-1. The main processor 1111 may further include at least one of a graphic processing unit (GPU) 1111-2, a communication processor (CP), and an image signal processor (ISP). The main processor 1111 may further include a neural processing unit (NPU) 1111-3. The NPU 1111-3 is a processor designed for processing an artificial intelligence (AI) model, and the AI model may be generated through machine learning. The AI model may include a plurality of artificial neural network layers. An artificial neural network may be, for example, a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-network, or one of two or more combinations thereof, but the present disclosure is not limited thereto. The AI model may additionally or alternatively include a software structure, in addition to a hardware structure. At least two of the above-described processing units and the above-described processors may be implemented into one integrated component (e.g., a single chip), or be implemented as components (e.g., a plurality of chips) independent from each other.

The auxiliary processor 1112 may include a controller 1112-1. The controller 1112-1 may include an interface conversion circuit and a timing control circuit. In an example, the controller 1112-1 may include the timing controller 140 shown in FIG. 1. The controller 1112-1 may receive an image signal from the main processor 1111, and convert a data format of the image signal to be suitable for interface specifications with the display module 1140, thereby outputting image data. The controller 1112-1 may output various control signals utilized to drive of the display module 1140.

The auxiliary processor 1112 may further include a data conversion circuit 1112-2, a gamma correction circuit 1112-3, a rendering circuit 1112-4, a touch control circuit 1112-5, and the like. The data conversion circuit 1112-2 may receive image data from the controller 1112-1, and compensate for the image data such that an image is displayed with a desired luminance according to a characteristic of the electronic device 1000 or a setting of the user, or convert the image data for the purpose of, for example, reduction of power consumption, afterimage compensation, or the like.

The gamma correction circuit 1112-3 may convert image data, a gamma reference voltage, or the like such that an image displayed in the electronic device 1000 has a desired gamma characteristic. The rendering circuit 1112-4 may receive image data from the controller 1112-1, and render the image data by considering a pixel arrangement of the display panel 1141, and the like, applied to the electronic device 1000.

The touch control circuit 1112-5 may supply a touch signal to the input sensor 1161-2, and be supplied with a sensing signal from the input sensor 1161-2, corresponding to the touch signal.

At least one of the data conversion circuit 1112-2, the gamma correction circuit 1112-3, the rendering circuit 1112-4, and the touch control circuit 1112-5 may be integrated in another component (e.g., the main processor 1111 or the rendering circuit 1112-4). At least one of the data conversion circuit 1112-2, the gamma correction circuit 1112-3, and the rendering circuit 1112-4 may be integrated into a source driver 1143, which will be described in further detail below.

The memory 1120 may store various data used by at least one component (e.g., the processor 1110 or the sensor module 1161) of the electronic device 1000, and input or output data about a command associated therewith, and may also store various setting data corresponding to the setting of the user the memory 1120. The memory 1120 may include at least one of the volatile memory 1121 and the nonvolatile memory 1122.

The input module 1130 may receive a command or data to be used in a component (e.g., the processor 1110, the sensor module 1161, or the sound output module 1163) of the electronic device 1000 from an external source (e.g., the user or the external electronic device 2000) of the electronic device 1000.

The input module 1130 may include a first input module 1131 to which a command or data is input from the user, and a second input module 1132 to which a command or data is input from the external electronic device 2000. The first input module 1131 may include, for example, a microphone, a mouse, a keyboard, a key (e.g., a button), or a pen (e.g., a passive pen or an active pen). The second input module 1132 may support a specified protocol capable of connecting the electronic device 1000 to the external electronic device 2000, for example, by wired or wireless communication. According to embodiments, the second input module 1132 may include, for example, a high definition multimedia interface (HDMI), a universal serial bus (USB) interface, an SD card interface, or an audio interface. The second input module 1132 may include, for example, a connector, e.g., an HDMI connector, a USB connector, an SD card connector, or an audio connector (e.g., a headphone connector), which can physically connect the electronic device 1000 to the external electronic device 2000.

The display module 1140 may visually provide information to the user. The display module 1140 may include the display panel 1141, a gate driver 1142, the source driver 1143, and a voltage generating circuit 1144. The display module 1140 may further include a window that protects the display panel 1141, a chassis, and a bracket. The display module 1140 may include at least some components of the display device 100 shown in FIG. 1.

The display panel 1141 (or display) may include, for example, a liquid crystal display panel, an organic light emitting display panel, or an inorganic light emitting display panel. However, the type of the display panel 1141 is not limited thereto. The display panel 1141 may be of a rigid type or a flexible type in which the display panel 1141 is rollable or foldable. The display module 1140 may further include a supporter that supports the display panel 1141, a bracket, a heat dissipation member, or the like. The display panel 1141 may include the display unit 110 shown in FIG. 1. The display panel 1141 may include the pixels PX shown in FIG. 1.

The gate driver 1142 may be a driving chip, and may be mounted in the display panel 1141. Also, the gate driver 1142 may be integrated in the display panel 1141. For example, the gate driver 1142 may include an amorphous silicon TFT gate (ASG) driver circuit, a low temperature polycrystalline silicon (LTPS) TFT gate driver circuit, or an oxide semiconductor TFT gate (OSG) driver circuit, which is embedded in the display panel 1141. The gate driver 1142 may receive a control signal from the controller 1112-1, and output scan signals to the display panel 1141 in response to the control signal. The gate driver 1142 may include the scan driver 120 shown in FIG. 1. The gate driver 1142 may include the stage circuit shown in FIG. 5.

The display module 1140 may further include the sensing driver 160 shown in FIG. 1. The sensing driver 160 may output a sensing signal to the display panel 1141. The sensing driver 160 may be formed separately from the gate driver 1142, or be integrated in the gate driver 1142.

The source driver 1143 may receive a control signal from the controller 1112-1, and convert image data into an analog voltage (e.g., a data voltage), and then output data voltages to the display panel 1141 in response to the control signal. The source driver 1143 may include the data driver 130 shown in FIG. 1.

The source driver 1143 may be integrated in another component (e.g., the controller 1112-1). Functions of the interface conversion circuit and the timing control circuit of the controller 1112-1, which are described above, may be integrated in the source driver 1143.

The voltage generating circuit 1144 may output various voltages utilized to drive the display panel 1141. In an example, the voltage generating circuit 1144 may include the power generator 150 shown in FIG. 1.

In an embodiment, the source driver 1143 may convert data corresponding to red (R), green (G), and blue (B), included in image data received from the processor 1110, into a red data signal (or data voltage), a green data signal (or data voltage), and a blue data signal (or data voltage), and provide the red data signal, the green data signal, and the blue data signal to a plurality of pixel columns included in the display panel 1141 during one horizontal period.

The power module 1150 may supply power to at least one component of the electronic device 1000. The power module 1150 may include a battery that provides a power voltage. The battery may include a primary cell which is not rechargeable, a secondary cell which is rechargeable, or a fuel cell. The power module 1150 may include a power management integrated circuit (PMIC). The PMIC may supply an optimized power source to each of the above-described modules as well as other modules included in the electronic device 1000. The power module 1150 may include a wireless power transmission/reception component electrically connected to the battery. The wireless power transmission/reception component may include a plurality of coil-shaped antenna radiators. In an embodiment, at least some components of the power module 1150 and the voltage generating circuit 1144 may be integrated into one component. The voltage generating circuit 1144 may be included in the power module 1150.

The electronic device 1000 may further include the internal module 1160 and the external module 1170. The internal module 1160 may include the sensor module 1161, the antenna module 1162, and the sound output module 1163.

The external module 1170 may include the camera module 1171, a light module 1172, and the communication module 1173.

The sensor module 1161 may sense an input caused by a body of the user or an input caused by a pen in the first input module, and generate an electrical signal or a data value, which corresponds to the input. The sensor module 1161 may include at least one of the fingerprint sensor 1161-1, the input sensor 1161-2, and a digitizer 1161-3.

The fingerprint sensor 1161-1 may generate a data value corresponding to a fingerprint of the user.

The input sensor 1161-2 may generate a data value corresponding to coordinate information of the input caused by the body of the user or the input caused by the pen. The input sensor 1161-2 may generate, as a data value, a capacitance variation caused by the input. The input sensor 1161-2 may sense an input caused by a passive pen, or transmit/receive data to/from an active pen.

The input sensor 1161-2 may measure a biometric signal such as pressure, moisture or body fat. For example, when the user does not move for a constant specified period of time while a body part of the user is in contact with a sensor layer or a sensing panel, the input sensor 1161-2 may output information which the user wants to the display module 1140 by sensing a biometric signal, based on a change in electric field, caused by the body part.

The digitizer 1161-3 may generate a data value corresponding to the coordinate information of the input caused by the pen. The digitizer 1161-3 may generate, as a data value, electromagnetic variation caused by the input. The digitizer 1161-3 may sense an input caused by the passive pen, or transmit/receive data to/from the active pen.

At least one of the fingerprint sensor 1161-1, the input sensor 1161-2, and the digitizer 1161-3 may be implemented as a sensor layer formed on the display panel 1141 through a continuous process. At least one of the fingerprint sensor 1161-1, the input sensor 1161-2, and the digitizer 1161-3 may be disposed at an upper side of the display panel 1141, and any one of, e.g., the digitizer 1161-3 among the fingerprint sensor 1161-1, the input sensor 1161-2, and the digitizer 1161-3 may be disposed at a lower side of the display panel 1141.

At least two of the fingerprint sensor 1161-1, the input sensor 1161-2, and the digitizer 1161-3 may be integrated into one sensing panel through the same process. When at least two of the fingerprint sensor 1161-1, the input sensor 1161-2, and the digitizer 1161-3 are integrated into one sensing panel, the sensing panel may be disposed between the display panel 1141 and the window disposed at an upper side of the display panel 1141. According to embodiments, the sensing panel may be disposed on the window. However, the position of the sensing panel is not limited thereto.

At least one of the fingerprint sensor 1161-1, the input sensor 1161-2, and the digitizer 1161-3 may be built in the display panel 1141. That is, at least one of fingerprint sensor 1161-1, the input sensor 1161-2, and the digitizer 1161-3 may be simultaneously formed through a process of forming elements (e.g., a light emitting element, a transistor, and the like) included in the display panel 1141.

The sensor module 1161 may generate an electrical signal or a data value, which corresponds to an internal state or an external state of the electronic device 1000. The sensor module 1161 may further include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The antenna module 1162 may include one or more antennas that transmit/receive a signal or power. According to embodiments, the communication module 1173 may transmit a signal to the external electronic device or receive a signal from the external electronic device through an antenna suitable for a communication scheme. An antenna pattern of the antenna module 1162 may be integrated in one component (e.g., the display panel 1141) of the display module 1140, the input sensor 1161-2, or the like.

The sound output module 1163 is a device that outputs a sound signal to the outside of the electronic device 1000, and may include, for example, a speaker used for general purpose such as multimedia playback or transcription playback and a receiver used primarily for call reception. According to embodiments, the receiver may be integrally formed with the speaker or be formed separately from the speaker. A sound output pattern of the sound output module 1163 may be integrated in the display module 1140.

The camera module 1171 may photograph a still image and a moving image (e.g., video). According to embodiments, the camera module 1171 may include one or more lenses, an image sensor, or an image signal processor. The camera module 1171 may further include an infrared camera capable of measuring the presence of the user, a position of the user, the eyes of the user, or the like.

The light module 1172 may provide light. The light module 1172 may include, for example, a light emitting diode or a xenon lamp. The light module 1172 may operate in conjunction with the camera module 1171 or operate independently from the camera module 1171.

The communication module 1173 may establish a wired or wireless communication channel between the electronic device 1000 and the external electronic device 2000, and support communication performance through the established communication channel. The communication module may include any one or all of a wireless communication module such as, for example, a cellular communication module, a short-range wireless communication module, or a global navigation satellite system (GNSS) communication module, and a wired communication module such as, for example, a local area network (LAN) communication module or a power line communication (PLC) module. The communication module 1173 may communicate with the external electronic device 2000 through a short-range communication network such as, for example, Bluetooth™, wireless-fidelity (WiFi) direct, or infrared data association (IrDA), or a long-range communication network such as, for example, a cellular network, the Internet, or a computer network (e.g., LAN or wide area network (WAN)). The above-described types of communication modules may be implemented into one chip or be respectively implemented as separate chips.

The input module 1130, the sensor module 1161, the camera module 1171, and the like may be used to control an operation of the display module 1140 in conjunction with the processor 1110.

The processor 1110 may output a command or data to the display module 1140, the sound output module 1163, the camera module 1171, or the light module 1172, based on input data received from the input module 1130. For example, in an embodiment, the processor 1110 may generate image data, corresponding to input data applied through, for example, a mouse, an active pen, or the like, and output the image data to the display module 1140. In an embodiment, the processor 1110 may generate command data, corresponding to the input data, and output the command data to the camera module 1171 or the light module 1172. When no input data is received from the input module 1130, the processor 1110 may change the operation mode of the electronic device 1000 to a low power mode or a sleep mode. As a result, power consumed by the electronic device 1000 may be reduced.

The processor 1110 may output a command or data to the display module 1140, the sound output module 1163, the camera module 1171, or the light module 1172, based on sensing data received from the sensor module 1161. For example, the processor 1110 may compare authentication data applied by the fingerprint sensor 1161-1 with authentication data stored in the memory 1120, and then execute an application according to a comparison result. The processor 1110 may execute a command or output corresponding image data to the display module 1140, based on sensing data sensed by the input sensor 1161-2 or the digitizer 1161-3. When a temperature sensor is included in the sensor module 1161, the processor 1110 may receive temperature data about a temperature measured from the sensor module 1161, and further perform luminance correction on image data, based on the temperature data.

The processor 1110 may receive measurement data about, for example, the presence of the user, the position of the user, the eyes of the user, or the like from the camera module 1171. The processor 1110 may further perform luminance correction on image data, based on the measurement data. For example, the processor 1110, which may determine the presence of the user through an input from the camera module 1171, may output image data of which luminance is corrected to the display module 1140 through the data conversion circuit 1112-2 or the gamma correction circuit 1112-3.

At least some of the above-described components may be connected to each other and communicate signals (e.g., commands or data) therebetween through an inter-peripheral communication scheme such as, e.g., a bus, a general purpose input/output (GPIO), a serial peripheral interface (SPI), a mobile industry processor interface (MIPI), or an ultra path interconnect (UPI) link. The processor 1110 may communicate with the display module 1140 through an appointed interface, and use any one of the above-described communication schemes. However, the present disclosure is not limited to the above-described communication schemes.

In the stage circuit and the display device including the same according to embodiments of the present disclosure, a scan signal and an emission control signal can be supplied using one stage circuit. Thus, the area with which the stage circuit is mounted can be reduced, and accordingly, dead space can be reduced.

While the present disclosure has been particularly shown and described with reference to embodiments thereof, it will be understood by those of ordinary skill in the art that various changes in form and detail may be made therein without departing from the spirit and scope of the present disclosure as defined by the following claims.

What is claimed is:

1. A stage circuit, comprising:

a first input terminal, a second input terminal, a third input terminal, a fourth input terminal, and a fifth input terminal;

a first power input terminal, a second power input terminal, and a third power input terminal;

a first output terminal, a second output terminal, and a third output terminal;

an input circuit connected to the first input terminal and the second input terminal, wherein the input circuit is configured to control a voltage of a first node;

a driver connected to the first power input terminal, the second power input terminal, and the third power input terminal, wherein the driver is configured to control the voltage of the first node and a voltage of a second node;

a first output circuit connected to the third input terminal and the third power input terminal, wherein the first output circuit is configured to supply a carry signal to the third output terminal, corresponding to the voltage of each of the first node and the second node;

a second output circuit connected to the fourth input terminal and the second power input terminal, wherein the second output circuit is configured to supply a scan signal to the first output terminal, corresponding to the voltage of each of the first node and the second node; and a third output circuit connected to the second power input terminal and the first power input terminal, wherein the third output circuit is configured to supply an emission control signal to the second output terminal, corresponding to a voltage of each of a third node electrically connected to the first node and a fourth node electrically connected to the second node.

2. The stage circuit of claim 1, wherein each of the scan signal and the carry signal has a high level, wherein the scan signal is supplied to the first output terminal, the carry signal is supplied to the third output terminal, and the scan signal and the carry signal at least partially overlap with each other, and wherein the emission control signal has a low level, is supplied to the second output terminal, and overlaps with the scan signal having the high level.

3. The stage circuit of claim 1, further comprising:

a first voltage controller connected to the fifth input terminal, wherein the first voltage controller is configured to control the voltage of the fourth node;

a second voltage controller connected to the third input terminal, wherein the second voltage controller is configured to control a voltage of the third output terminal; and a voltage maintenance circuit connected to the first power input terminal, wherein the voltage maintenance circuit is configured to maintain the voltage of the third node to be lower than the voltage of the first node when the voltage of the first node increases, and maintain the voltage of the second node to be lower than the voltage of the fourth node when the voltage of the fourth node increases.

4. The stage circuit of claim 3, wherein a start signal or a previous carry signal of a previous stage is input to the first input terminal, a first carry clock signal is input to the second input terminal, a second carry clock signal is input to the third input terminal, a first clock signal is input to the fourth input terminal, and a second clock signal is input to the fifth input terminal, wherein a first power source is input to the first power input terminal, a second power source lower than the first power source is input to the second power input terminal, and a third power source lower than the first power source is input to the third power input terminal.

5. The stage circuit of claim 4, wherein the first carry clock signal and the second carry clock signal have a same cycle and have a phase difference of about 120 degrees.

6. The stage circuit of claim 4, wherein the first clock signal and the second clock signal have a same cycle and have a phase difference of about 120 degrees.

7. The stage circuit of claim 4, wherein a voltage of the third power source is lower than a voltage of the second power source.

8. The stage circuit of claim 4, wherein the second carry clock signal and the first clock signal are a same signal.

9. The stage circuit of claim 4, wherein the input circuit includes a first input transistor and a second input transistor, connected in series between the first input terminal and the first node, wherein each of the first input transistor and the second input transistor includes a gate electrode connected to the second input terminal.

10. The stage circuit of claim 4, wherein the driver includes:

a first driving transistor connected between the third power input terminal and a fifth node, wherein the first driving transistor includes a gate electrode connected to the first node;

a second driving transistor connected between the second power input terminal and the second node, wherein the second driving transistor includes a gate electrode connected to the first node;

a third driving transistor and a fourth driving transistor, connected in series between the fifth node and the first power input terminal, wherein each of the third driving transistor and the fourth driving transistor includes a gate electrode connected to the first power input terminal;

a fifth driving transistor connected between the second node and the first power input terminal, wherein the fifth driving transistor includes a gate electrode connected to the fifth node; and a capacitor connected between the fifth node and the second node.

11. The stage circuit of claim 4, wherein the first output circuit includes:

a first carry transistor connected between the third input terminal and the third output terminal, wherein the first carry transistor includes a gate electrode connected to the first node;

a second carry transistor connected between the third output terminal and the third power input terminal, wherein the second carry transistor includes a gate electrode connected to the second node; and a carry capacitor connected between the first node and the third output terminal.

12. The stage circuit of claim 4, wherein the second output circuit includes:

a first scan transistor connected between the fourth input terminal and the first output terminal, wherein the first scan transistor includes a gate electrode connected to the first node; and a second scan transistor connected between the first output terminal and the second power input terminal, wherein the second scan transistor includes a gate electrode connected to the second node.

13. The stage circuit of claim 4, wherein the third output circuit includes:

a first emission transistor connected between the second power input terminal and the second output terminal, wherein the first emission transistor includes a gate electrode connected to the third node;

a second emission transistor connected between the second output terminal and the first power input terminal, wherein the second emission transistor includes a gate electrode connected to the fourth node; and an emission capacitor connected between the fourth node and the second output terminal.

14. The stage circuit of claim 4, wherein the first voltage controller includes:

a first capacitor including a second electrode connected to the fourth node; and a first transistor connected between a first electrode of the first capacitor and the fifth input terminal, wherein the first transistor includes a gate electrode connected to the fourth node.

15. The stage circuit of claim 4, wherein the second voltage controller includes:

a first control transistor and a second control transistor, connected in series between the first node and the third output terminal, wherein a gate electrode of the first control transistor is connected to the third input terminal, and a gate electrode of the second control transistor is connected to the second node.

16. The stage circuit of claim 4, wherein the voltage maintenance circuit includes:

a first maintenance transistor connected between the first node and the third node, wherein the first maintenance transistor includes a gate electrode connected to the first power input terminal; and a second maintenance transistor connected between the second node and the fourth node, wherein the second maintenance transistor includes a gate electrode connected to the first power input terminal.

17. A display device, comprising:

a display panel including a plurality of pixels connected to a plurality of scan lines, a plurality of data lines, and a plurality of emission control lines; and a scan driver including a plurality of stage circuits configured to supply a scan signal and an emission control signal, respectively, to the scan lines and the emission control lines, wherein each of the stage circuits includes:

a first input terminal, a second input terminal, a third input terminal, a fourth input terminal, and a fifth input terminal;

a first power input terminal, a second power input terminal, and a third power input terminal;

a first output terminal, a second output terminal, and a third output terminal;

an input circuit connected to the first input terminal and the second input terminal, wherein the input circuit is configured to control a voltage of a first node;

a driver connected to the first power input terminal, the second power input terminal, and the third power input terminal, wherein the driver is configured to control the voltage of the first node and a voltage of a second node;

a first output circuit connected to the third input terminal and the third power input terminal, wherein the first output circuit is configured to supply a carry signal to the third output terminal, corresponding to the voltage of each of the first node and the second node;

a second output circuit connected to the fourth input terminal and the second power input terminal, wherein the second output circuit is configured to supply a scan signal to the first output terminal, corresponding to the voltage of each of the first node and the second node;

a third output circuit connected to the second power input terminal and the first power input terminal, wherein the third output circuit is configured to supply an emission control signal to the second output terminal, corresponding to a voltage of each of a third node electrically connected to the first node and a fourth node electrically connected to the second node;

a first voltage controller connected to the fifth input terminal, wherein the first voltage controller is configured to control the voltage of the fourth node;

a second voltage controller connected to the third input terminal, wherein the second voltage controller is configured to control a voltage of the third output terminal; and a voltage maintenance circuit connected to the first power input terminal, wherein the voltage maintenance circuit is configured to maintain the voltage of the third node to be lower than the voltage of the first node when the voltage of the first node increases, and maintain the voltage of the second node to be lower than the voltage of the fourth node when the voltage of the fourth node increases.

18. The display device of claim 17, wherein a start signal or a carry signal is input to a first input terminal of a pth stage circuit, wherein p=3k−2 and k is a positive integer, a first carry clock signal is input to a second input terminal of the pth stage circuit, a third carry clock signal is input to a third input terminal of the pth stage circuit, a third clock signal is input to a fourth input terminal of the pth stage circuit, and a fifth clock signal is input to a fifth input terminal of the pth stage circuit, wherein a carry signal of a previous stage circuit is input to a first input terminal of a (p+1)th stage circuit, the fifth carry clock signal is input to a second input terminal of the (p+1)th stage circuit, a first carry clock signal is input to a third input terminal of the (p+1)th stage circuit, the fifth clock signal is input to a fourth input terminal of the (p+1)th stage circuit, and a first clock signal is input to a fifth input terminal of the (p+1)th stage circuit, and wherein a carry signal of a previous stage circuit is input to a first input terminal of a (p+2)th stage circuit, the fifth carry clock signal is input to a second input terminal of the (p+2)th stage circuit, the first carry clock signal is input to a third input terminal of the (p+2)th stage circuit, the first clock signal is input to a fourth input terminal of the (p+2)th stage circuit, and the third clock signal is input to a fifth input terminal of the (p+2)th stage circuit.

19. The display device of claim 18, wherein the first clock signal, a second clock signal, and the third clock signal are sequentially supplied while having a phase difference of about 120 degrees, and wherein the first carry clock signal has a same cycle and phase as the first clock signal, a second carry clock signal has a same cycle and phase as the second clock signal, and the third carry clock signal has a same cycle and phase as the third clock signal.

20. An electronic device, comprising:

a processor to provide input image data; and a display device to display an image based on the input image data, wherein the display device comprises:

a display panel including a plurality of pixels connected to a plurality of scan lines, a plurality of data lines, and a plurality of emission control lines; and a scan driver including a plurality of stage circuits configured to supply a scan signal and an emission control signal, respectively, to the scan lines and the emission control lines, wherein each of the stage circuits includes:

a first input terminal, a second input terminal, a third input terminal, a fourth input terminal, and a fifth input terminal;

a first power input terminal, a second power input terminal, and a third power input terminal;

a first output terminal, a second output terminal, and a third output terminal;

an input circuit connected to the first input terminal and the second input terminal, wherein the input circuit is configured to control a voltage of a first node;

a driver connected to the first power input terminal, the second power input terminal, and the third power input terminal, wherein the driver is configured to control the voltage of the first node and a voltage of a second node;

a first output circuit connected to the third input terminal and the third power input terminal, wherein the first output circuit is configured to supply a carry signal to the third output terminal, corresponding to the voltage of each of the first node and the second node;

a second output circuit connected to the fourth input terminal and the second power input terminal, wherein the second output circuit is configured to supply a scan signal to the first output terminal, corresponding to the voltage of each of the first node and the second node;

a third output circuit connected to the second power input terminal and the first power input terminal, wherein the third output circuit is configured to supply an emission control signal to the second output terminal, corresponding to a voltage of each of a third node electrically connected to the first node and a fourth node electrically connected to the second node.

* * * * *